United States Patent
Li et al.

(10) Patent No.: US 7,092,727 B1
(45) Date of Patent: Aug. 15, 2006

(54) APPARATUS AND METHOD FOR SUPPORTING DIFFERENTIATED PACKET DATA SERVICES WITHIN A WIRELESS NETWORK

(75) Inventors: Xiao-Dong Li, Ottawa (CA); Patrick Lie Chin Cheong, Nepean (CA); Ashraf S. Mahmoud, Nepean (CA); Mazda Salmanlan, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 1196 days.

(21) Appl. No.: 09/708,782

(22) Filed: Nov. 8, 2000

(51) Int. Cl.
*H04Q 7/20* (2006.01)

(52) U.S. Cl. ............... 455/466; 455/426.1; 455/426.2; 455/560; 455/561; 370/329; 370/348; 370/352; 370/395.1; 370/395.2; 370/400; 370/469; 370/474; 370/395.5

(58) Field of Classification Search ............... 370/338, 370/328, 329, 345, 348, 349, 351, 352, 395.1, 370/395.2, 395.21, 400, 401, 419, 420, 463, 370/465, 469, 466, 474, 395.5; 455/426.1, 455/426.2, 560, 561, 466
See application file for complete search history.

(56) References Cited

U.S. PATENT DOCUMENTS

| | | | |
|---|---|---|---|
| 5,819,043 A * | 10/1998 | Baugher et al. ............. 709/222 |
| 6,307,867 B1 * | 10/2001 | Roobol et al. .............. 370/470 |
| 6,366,761 B1 * | 4/2002 | Montpetit ................... 455/12.1 |
| 6,434,141 B1 * | 8/2002 | Oz et al. ..................... 370/352 |
| 6,438,114 B1 * | 8/2002 | Womack et al. ............ 370/329 |
| 6,438,370 B1 * | 8/2002 | Einola et al. ............. 455/422.1 |
| 6,507,567 B1 * | 1/2003 | Willars ....................... 370/321 |
| 6,542,739 B1 * | 4/2003 | Garner ....................... 455/427 |
| 6,546,425 B1 * | 4/2003 | Hanson et al. .............. 709/227 |
| 6,553,006 B1 * | 4/2003 | Kalliokulju et al. ........ 370/310 |
| 6,556,824 B1 * | 4/2003 | Purnadi et al. ............. 455/434 |
| 6,567,408 B1 * | 5/2003 | Li et al. ................. 370/395.31 |
| 6,574,473 B1 * | 6/2003 | Rinne et al. ................ 455/436 |
| 6,594,238 B1 * | 7/2003 | Wallentin et al. ........... 370/252 |
| 6,606,311 B1 * | 8/2003 | Wang et al. ................ 370/338 |
| 6,608,832 B1 * | 8/2003 | Forslow ...................... 370/353 |
| 6,615,269 B1 * | 9/2003 | Suumaki ..................... 709/230 |
| 6,618,591 B1 * | 9/2003 | Kalliokulju et al. ........ 370/468 |
| 6,631,125 B1 * | 10/2003 | Longoni et al. ............ 370/341 |

(Continued)

*Primary Examiner*—Matthew Anderson
*Assistant Examiner*—Sujatha Sharma
(74) *Attorney, Agent, or Firm*—Garlick, Harrison & Markison; Bruce Garlick

(57) ABSTRACT

A system and method manages Radio Access Network (RAN) resources to service packet data transmissions at Service Quality Levels (SQL) commensurate with packet data network SQLs. A Packet Data Serving Node (PDSN) receives a data packet from a coupled packet data network. The data packet is directed toward a Mobile Station (MS) serviced by the RAN and includes a packet SQL indicator that indicates the level of service provided by the data packet network. A corresponding set of RAN resources is allocated to meet the packet SQL indicator. If the set of RAN resources cannot be allocated, the data packet SQL indicator is remarked accordingly. In another operation, the BSC receives a data packet from a MS serviced by the RAN. The data packet is intended for a coupled packet data network and includes a packet SQL indicator. The BSC first determines a set of allocated RAN resources that are servicing the transmission of the data packet to the packet data network. The BSC then maps the allocated set of RAN resources to a RAN service quality level indicator. If the data packet SQL indicator is incorrectly marked, it is remarked by the PDSN. These operation provide support for both specific SQL operations and differential SQL operations.

46 Claims, 14 Drawing Sheets

U.S. PATENT DOCUMENTS 6,631,269 B1 * 10/2003 Cave .......................... 455/450
6,650,905 B1 * 11/2003 Toskala et al. ............. 455/522
6,661,780 B1 * 12/2003 Li .............................. 370/324
2004/0107281 A1 * 6/2004 Bose et al. ................. 709/226

* cited by examiner

QOS defined for RAN →

| Prec. | R/BW | FER/Pwr | Delay | MAC Timers | Burst |
|---|---|---|---|---|---|
| 0 | 153.6 | 0.1%/Hi | Minimum | minimum | 5 |
| 1 | 153.6 | 1.0/Hi | 150 msec | minimum | 5 |
| 2 | 76.8 | 0.5%/nom | 150 msec | nominal | 3 |
| 3 | 38.4 | 1.0%/nom | 250 msec | nominal | 4 |
| 4 | 19.2 | 1.0%/nom | 250 msec | nominal | 5 |
| 5 | 19.2 | 1.0%/nom | 500 msec | nominal | 3 |
| 6 | 19.2 | 1.0%/nom | -- | nominal | - |

(1) Gold: Prec. 0–1
(2) Silver: Prec. 2–3
(3) Bronze: Prec. 4–6

Priority Defined within RAN →

FIG. 5A

APPARATUS AND METHOD FOR SUPPORTING DIFFERENTIATED PACKET DATA SERVICES WITHIN A WIRELESS NETWORK

BACKGROUND

1. Technical Field

The present invention relates generally to wireless networks; and more particularly to the service of packet data transmissions within such wireless networks at differentiated service quality levels.

2. Related Art

Wireless networks are well known. Cellular wireless networks support wireless communication services in many populated areas of the world. Satellite wireless networks are known to support wireless communication services across most surface areas of the Earth. While wireless networks were initially constructed to service voice communications, they are now called upon to support data communications as well.

The demand for data communication services has exploded with the acceptance and widespread use of the Internet. While data services have historically been serviced via wired connections, wireless users are now demanding that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless network data communications will only increase with time. Thus wireless networks are currently being created/modified to service these burgeoning data service demands.

Significant performance issues exist when using a wireless network to service data communications. Wireless networks were initially designed to service the well-defined requirements of voice communications. Generally speaking, voice communications require a sustained bandwidth of approximately 4 kHz with minimum signal-to-noise ratio (SNR) and continuity requirements. Data communications, on the other hand, have very different performance requirements. Data communications are typically bursty, discontinuous, and may require a relatively high bandwidth during their active portions. To understand the difficulties in servicing data communications within a wireless network, consider the structure and operation of a cellular wireless network.

Cellular wireless networks include a "network infrastructure" that wirelessly communicates with mobile stations (MSs) within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also couples to a corresponding Packet Data Serving Node (PDSN), which also couples to the Internet. The wireless network infrastructure accessed by the PDSN, i.e., a coupled BSC and base stations coupled to the BSC is referred to as the Radio Access Network (RAN). The PDSN is a term specific to the CDMA standards. According to other standards, devices performing similar functions to the PDSN may be referred to as the SGSN and the GGSN (GPRS standard and UMTS standard), for example.

In operation, a MS communicates with one (or more) of the base stations. A BSC coupled to the serving base station routes voice communications between the MSC and the serving base station. The MSC routes the voice communication to another MSC or to the PSTN. BSCs route data communications between a servicing base station and the PDSN. Thus, voice communications and data communications are serviced via different communication paths within the wireless network.

The wireless link between the base station and the MS is defined by one of a plurality of operating standards, e.g., AMPS, TDMA, CDMA, GSM, etc. These operating standards, as well as new 3G and 4G operating standards define the manner in which the wireless link may be allocated, setup, serviced and torn down. These operating standards must set forth operations that will be satisfactory in servicing both voice and data communications. Unfortunately, these operating standards must define such operations in a limited resource environment. The RAN has a maximum set of available resource, e.g., cell/sector bandwidth, communication routing bandwidth, etc. At any given time, all MSs being serviced by the cell/sector must share these RAN resources and must be rationally divided among all serviced MSs (and those requesting service). Any rational division of RAN resources must consider current voice communication demands, current data communication demands, the expected duration of current data communication demands, and the outstanding communications requests, among a number of considerations. Needless to say, this task is daunting.

In most wireless networks, the RAN supports the Transmission Control Protocol/Internet Protocol (TCP/IP) suite of communication protocols. Communications serviced by this protocol suite are typically referred to as "IP communications." IP communications are packet switched communications, unlike voice communications serviced by the PSTN and many wireless networks, which are circuit switched. An IP network, such as the Internet (and other similar IP communication networks), are networks of data routing switches, communication paths, and interfaces to other networks, e.g., WANs, LANs, the PSTN, wireless networks, etc.

The throughput of any particular path through an IP network, e.g., latency and bandwidth, depends upon switch latency and data path loading. Differing types of IP communications have differing types of performance requirements, e.g., latency, bandwidth, frame error rates, etc. These requirements are generally referred to as IP service quality levels (IP SQL). The IP SQL may be specific, in which particular latencies and bandwidths are required. The IP SQL may also be differential (Diff-Serv, or DS) in which the required level of performance is a particular level of support relative to other levels of support. IP networks provide both of these types of IP SQLs. IP packets typically include an IP SQL indicator in their headers. Each switch or router in the servicing data path processes and routes IP packets based upon their IP SQL indicators.

Because wireless networks are both architecturally and functionally dissimilar to IP networks, no solution exists to provide wireless data communication services with an IP SQL. Currently, the RAN services data communications at a single SQL and provides no differentiation in SQLs. Thus, all IP communications are handled in the same manner by the servicing wireless network, independent of the IP SQL requested for a corresponding data communication.

Thus, there is a need in the art for a system and method that may be employed to coordinate the allocation of RAN resources with the SQL of a serviced data communication.

SUMMARY OF THE INVENTION

Thus, to overcome the shortcomings of the prior systems, among other shortcomings, the present invention contemplates structure and operation that manages RAN resources to service packet data transmissions at RAN Service Quality Levels (SQL) commensurate with packet data network SQLs. Operation according to the present invention is performed by various components of a Radio Access Network (RAN), e.g., a Base Station Controller (BSC) and a Packet Control Function (PCF), and a Packet Data Serving Node (PDSN) coupled to the BSC by an R-P network/link.

According to a first operation of the present invention, the PDSN receives a data packet from a coupled packet data network. The data packet was sent from a device coupled via the packet data network and is directed toward a Mobile Station (MS) serviced by the RAN. The data packet includes a packet SQL indicator that was placed therein by the source of the data packet and that indicates the level of service provided by the data packet network. According to a goal of the present invention, the RAN should service transmission of the data packet to the MS at a SQL commensurate with the SQL indicated within the data packet. To meet this SQL, a corresponding set of RAN resources must be allocated. If the allocation is successful, the data packet is transmitted to the MS at a SQL that meets the SQL indicated in the data packet.

In allocating RAN resources, the PDSN and the BSC interact in two distinct manners. In a first manner, the PDSN retains the data packet and sends a message to the BSC requesting that the RAN allocate a corresponding set of RAN resources. If the allocation is successful, the BSC confirms the allocation to the PDSN and the PDSN forwards the data packet to the BSC via the R-P network. If the allocation is partially successful, the BSC maps the partial allocation of the corresponding set of RAN resources to a new packet SQL indicator, and relays the new packet SQL indicator to the PDSN. The PDSN then remarks the data packet (and subsequent data packets) with the new packet SQL indicator and forwards the data packet to the MS. If no allocation is made, the PDSN notifies the sending entity of the failed allocation.

According to a second distinct manner, the PDSN forwards the data packet with an SQL indicator understandable by the RAN to the BSC prior to an attempted allocation of RAN resources. The BSC then attempts an allocation of a corresponding set of RAN resources. If the allocation is successful, the BSC confirms the allocation to the PDSN. If the allocation is partially successful, the BSC maps the partial allocation of the corresponding set of RAN resources to a new packet SQL indicator, and relays the new packet SQL indicator to the PDSN. The PDSN then remarks other incoming data packets with the new packet SQL indicator prior to forwarding the data packets to the BSC.

The packet SQL indicator may require a specific RAN performance level. In such case, the BSC maps the packet SQL indicator directly to a level of RAN resources that will service the packet SQL. Alternately, the SQL requires a differential level of performance. In this case, the BSC maps the SQL indicator to a differential level of performance. In one particular embodiment, RAN performance levels are segregated into a number of precedence levels. Each subscriber may be assigned a plurality of different precedence levels, each of which provides a specific RAN performance levels. Based upon the differential level of service required, the packet SQL indicator is mapped to one of the precedence levels.

According to a second operation of the present invention, the BSC receives a data packet from a MS serviced by the RAN. The data packet is intended for a coupled packet data network and includes a packet SQL indicator. The BSC first determines a set of allocated RAN resources that are servicing the transmission of the data packet to the packet data network. The BSC then maps the allocated set of RAN resources to a RAN service quality level indicator, maps it to an IP SQL, then labels the data packet before sending it to the PDSN. Finally, when the packet service quality level indicator does not correspond to the RAN service quality level indicator, the PDSN remarks the data packet with a new packet service quality level indicator corresponding to the RAN service quality level indicator. Thus, while the first operation applies to forward link transmissions, the second operation applies to reverse link transmissions.

According to the present invention, the level of RAN resources allocated to any packet data session may be modified as the packet SQL indicator changes. The MS and a device coupled to the packet data network have an ongoing packet data session. At any point in time, the SQL required to service this packet data session may change. For forward link operations, the PDSN monitors the packet SQL indicator contained in each forward link data packet. When a data packet contains a new packet SQL indicator, the PDSN and the BSC interact to allocate a new set of RAN resources that correspond to the new packet SQL indicator. For reverse link transmissions, when the MS requests and receives a new RAN resource level, the BSC maps this new RAN resource level to a new RAN SQL indicator, indicates the new SQL to the PDSN and the PDSN may remark data packets accordingly.

The present invention therefore provides a highly efficient mechanism for managing RAN resources such that their level of allocation corresponds to ongoing data packet transmission SQL requirements. Moreover, other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered in conjunction with the following drawings, in which:

FIG. 5A is a diagram illustrating a RAN resource-mapping table constructed according to the present invention;

DETAILED DESCRIPTION OF THE DRAWINGS

Figure 1:
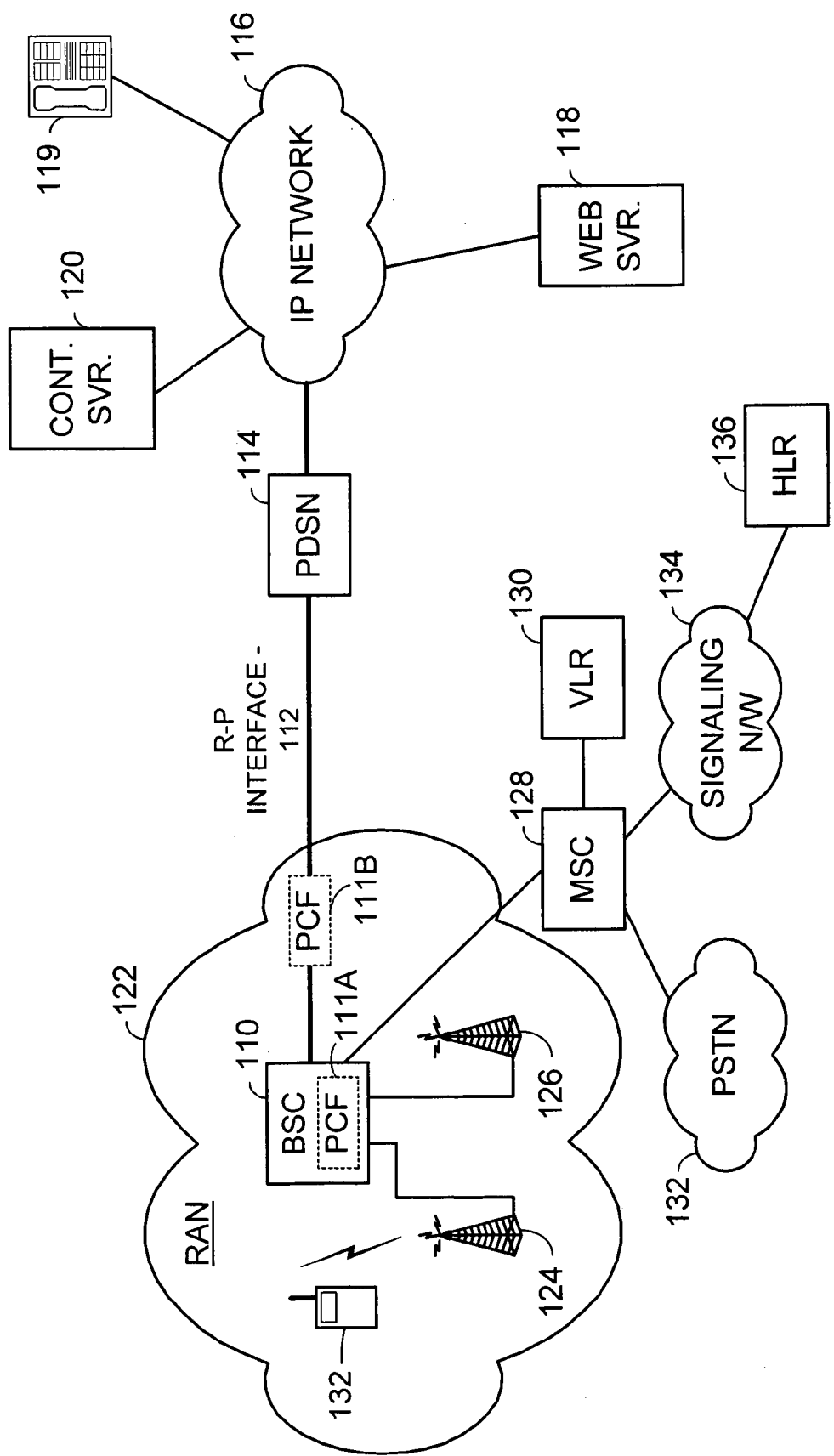
FIG. 1 is a diagram illustrating a system constructed according to the present invention.

FIG. 1 is a diagram illustrating a system constructed according to the present invention. In the system, an IP network 116 interfaces to a Radio Access Network (RAN) 122 via a Packet Data Serving Node (PDSN) 114 and an R-P Interface 112. The PDSN 114 serves as an edge node of the IP network 116. The RAN 122 includes a Base Station Controller (BSC) 110 and a plurality of bases stations 124 and 126. A Packet Control Function (PCF) 111A operates within the BSC 110 to support some of the functionality of the present invention. Alternatively, a PCF 111B may reside external to the BSC 110 and provide the same or similar functionality.

In the system of FIG. 1, base stations 124 and/or 126 wirelessly communicate with the MS 132. These wireless communications include both voice and data communications. Wireless transmissions from a base station 124 and/or 126 to the MS 132 are referred to as "forward link" transmissions. Wireless transmissions from the MS 132 to the base stations 124 and/or 126 are referred to as "reverse link" transmissions. The system of the present invention may be embodied using many different types of wireless physical layer protocol standards, e.g., CDMA, TDMA, GSM, AMPS, NAMPS, 3GPP, GSM-EDGE, CDMA2000, various 3G standards, various 4G standards, etc. As is generally known, these wireless physical layer protocols are transparent in most respects to the higher level protocol layers supported by the MS 132, e.g., IP, TCP, PPP, etc. Thus, the principles of the present invention apply to any of these standardized wireless physical layer protocols.

The BSC 110 couples to a Mobile Switching Center (MSC) 128 that interfaces the BSC 110 to at least one circuit switched communication network, e.g., the Public Switched Telephone Network (PSTN) 132. The MSC 128 also couples to a Visitor Location Register (VLR) 130, and to a Home Location Register (HLR) 136 via a signaling network 134. The HLR 136 and VLR 130 store MS subscriber attributes/parameters. The HLR 136 provides permanent storage for all attributes/parameters of its serviced MSs while the VLR 130 provides temporary storage at least some subscriber attributes for MSs currently being served by the corresponding MSC 128. The structure and operation of HLRs and VLRs is generally known. Thus, their operation will be described herein only as it relates to the present invention.

The base stations 124 and 126 also service data communications between the MS 132 and to devices coupled to the IP network 116, e.g., web server 118, content server 120 and IP telephony terminal 119. A communication path servicing these communications includes the wireless link between the MS 132 and a base station 124 and/or 126, the BSC 110, the R-P interface 112, the PDSN 114 and the IP network 116. These packetized communications may include requests for content, application data, web page content, multimedia content, control commands, packetized voice communications, IP telephony communications, and any other type of data that is packetized. A smallest amount of packetized data is commonly referred to as a data packet. Because the present invention discloses an embodiment relating to the IP, data packets will be referred to herein as IP packets. However, the present invention applies equally well to other types of data packets.

Operations according to the present invention will be discussed with reference to the Transmission Control Protocol/Internet Protocol (TCP/IP) protocol stack (suite), a set of operating standards promulgated by the Industry Standards Organization and various other standards bodies. The TCP/IP operating standards are well known and will be discussed herein only as they relate to the present invention. Further, the operations of the present invention apply equally well to other open and proprietary operating standards as well. Thus, the teachings of the present invention are not limited by the embodiments described herein but may be applied equally as well to other systems.

A data transmission from the web server 118, for example, that passes through the IP network 116, the PDSN 114, the R-P interface 112, the BSC 110, the base station 124, and across the wireless link to the MS 132 is referred to as a "forward link data communication." Conversely, a data transmission from the MS 132 that passes across a wireless link to base station 124, to the BSC 110, across the R-P interface to the PDSN 114, and through the IP network 116 to the content server 120, for example, is referred to as a "reverse link data communication." These communications may occur simultaneously during a Point-to-Point Protocol (PPP) data session. However, these communications may occur singularly as well.

Generally speaking, the present invention contemplates the coordination of RAN 122 resources to provide a RAN service quality level (RAN SQL) commensurate with an IP network 116 service quality level (IP SQL). RAN 122 resources may be described generally as a number of allocated channels, the data rate supported by an allocated channel, the Medium Access Control (MAC) parameters associated with the allocated channel(s) and various other parameters associated with the performance of the forward and reverse wireless links. Examples of these parameters will be discussed with reference to FIG. 5A. The service quality level provided by the RAN 122 or the IP network 116 may be a specific service quality level (QOS) or may be a differential service quality level (D-S). The R-N interface 112 may also be managed to provide a service quality level (R-N SQL) that is commensurate with the RAN SQL and the IP SQL.

According to a first aspect of the present invention, the system coordinates RAN 122 resources for the service of forward link data transmissions. In an example of such an operation, the PDSN 114 receives a forward link IP packet from the IP network 116 intended for the MS 132. Contained in this IP packet is an IP SQL. Upon receipt of the IP packet, the PDSN 114 and the BSC 110 interact in an attempt to allocate RAN 122 resources to provide a RAN SQL (RAN resource allocation) commensurate with the IP SQL. If such allocation is successful, the RAN 122 services the forward link data communication at the allocated RAN SQL. For unsuccessful RAN 122 resource allocations, the data communication may be serviced at a reduced RAN SQL or not at all. When a reduced RAN SQL is allocated, IP packets may be remarked to indicate the reduced RAN SQL. As a further operation in servicing forward link transmissions, RAN resources may be reallocated to satisfy a new IP SQL. Further, when RAN resources are reduced to provide a different RAN SQL, IP packets may be remarked accordingly.

According to a second aspect of the present invention, the system coordinates RAN 122 resources for the service of reverse link data transmissions. In an example of such an operation, the MS 132 desires to transmit one or more IP packets to a device coupled to the IP network 116, e.g., content server 120. In order to service this reverse link data communication, the MS 132 initiates formation of a reverse link wireless link with base station 124. Based upon a desired IP SQL contained in the IP packet (created by an application running on the MS 132), the MS 132 attempts to obtain a RAN SQL corresponding to the IP SQL. If such allocation is successful, the RAN 122 services the reverse link data communication and forwards the IP packet to the PDSN 114 via the R-P interface 112. The PDSN 114 then forwards the data packet via the IP network 116 to the content server 120. For unsuccessful RAN 122 resource allocations, the reverse link data communication may be serviced at a reduced RAN SQL. In such case, IP packets may be remarked by the PDSN 114 to indicate a corresponding RAN SQL. As a further operation in servicing reverse link transmissions, RAN resources may be reallocated to satisfy a new IP SQL. Further, when RAN resources are reduced to provide a different RAN SQL, IP packets may be remarked accordingly.

According to another aspect of the present invention, the PDSN 114 and the BSC 110 encapsulates/extracts IP packets traversing the R-P interface 112. The IP packets may be encapsulated into other protocol structure, such as PPP structures before R-P encapsulation. Thus, when reference is made herein to the encapsulation of an IP packet, it also implies encapsulation of the IP packet into any intermediate protocol structure as well as into the R-P interface structure.

The IS-835 standards body sets forth the Wireless Service Network Architecture Standards. A subset of this standards body sets forth the Interoperability standard (IOS). The IOS generally sets forth a method of encapsulating IP packets and passing them across the R-P interface 112 (and extracting the IP packets on the opposite side). According to the present invention, an R-P SQL indicator is included in the header of the R-P packets. The R-P packet encapsulation structure will be described with reference to FIG. 5B. The R-P interface 112 uses R-P SQL indicator to provide an appropriate level of service. For forward link data transmissions the BSC 110/PCF 111A also uses the R-P SQL indicator to manage the allocation of RAN resources. For reverse link data transmissions, the PDSN 114 uses the R-P SQL indicator for marking and remarking of IP packets.

IP data communications typically include both forward link transmissions and reverse link transmissions. In most wireless systems, forward link traffic channels, control channels, supplemental channels, and other forward link channels service forward link transmissions. Further, in such systems, reverse link traffic channels, access channels, and other types of reverse link channels service reverse link transmissions. Each type of channel has its own unique set of operating characteristics. Control channels and access channels, for example, are shared, and may provide no guaranteed throughput. Traffic channels, on the other hand, may be dedicated to particular MSs and provide particular throughput. Further, the manner in which any of these channels is serviced will affect its performance. The operations of the present invention apply equally well to any channel capable of carrying packetized data.

Figure 2:
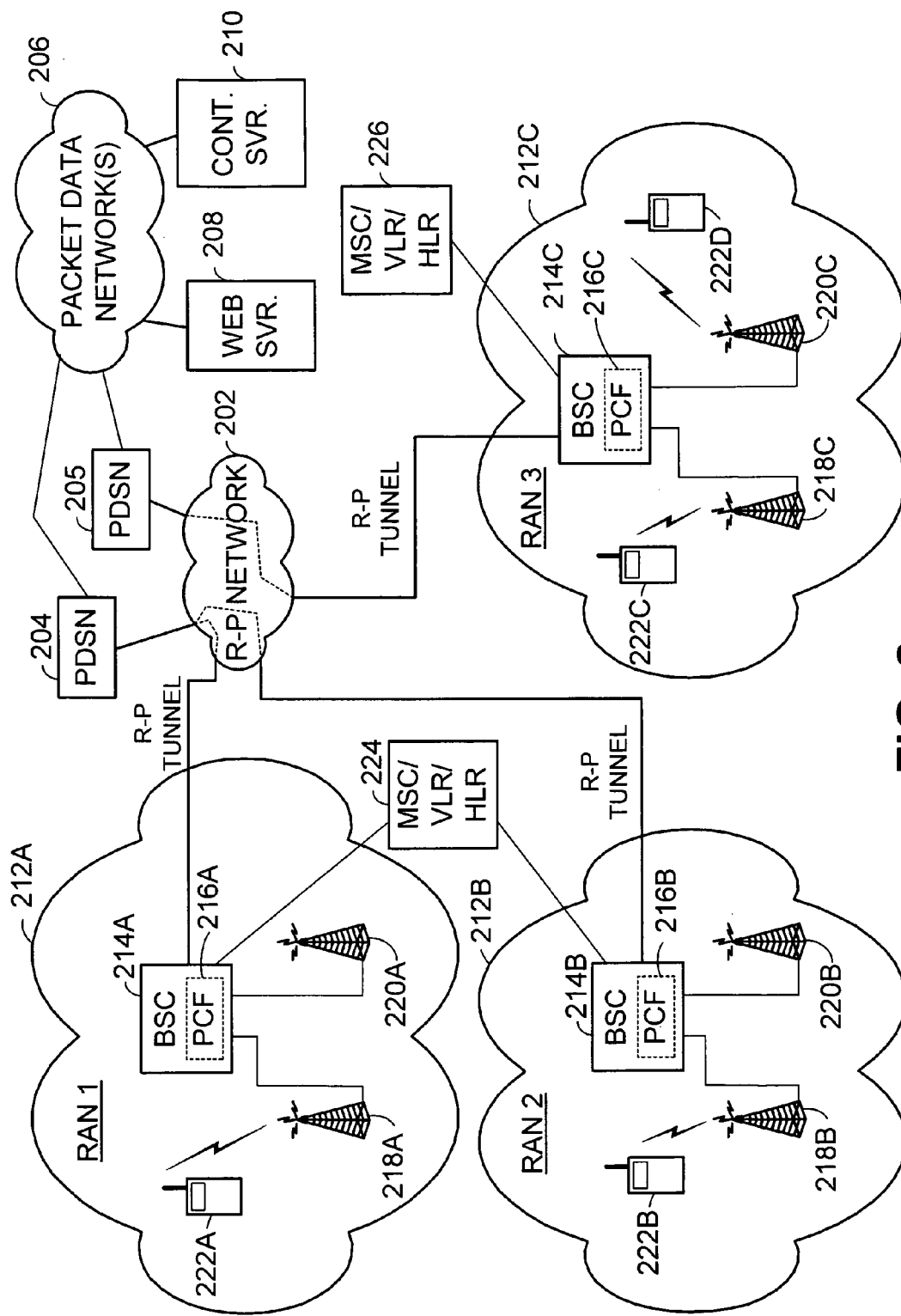
FIG. 2 is a diagram illustrating another system constructed according to the present invention.

FIG. 2 is a diagram illustrating another system constructed according to the present invention. The structure of FIG. 2 is provided to illustrate in more detail how a plurality of RANs 212A, 212B and 212C interface to a packet data network(s) 206. The packet data network(s) 206 may include the Internet, Intranets, Wide Area Networks, Local Area Networks, Public Networks, Private Networks, and other networks to which web servers 208, content servers 210 and other computers coupled. In the system of FIG. 2, the packet data network(s) 206 operates according to the TCP/IP protocol. However, in other embodiments, the packet data network(s) 206 may operate according to other packet data protocols.

The packet data network(s) 206 couples to RAN-1 212A and RAN-2 212B via a PDSN 204 and an R-P network 202. The packet data network(s) 206 also couples to RAN-3 212C via a PDSN 205 and an R-P network 202. The R-P network 202 is a packet switched network that includes a plurality of routers, switches, data links, and other resources to support the routing of traffic between the PDSNs 204 and 205 and the RAN-1 212A, RAN-2 212B and RAN-3 212C.

The RANs 212A, 212B and 212C each include respective BSCs, BSC 214A, 214B and 214C. Further, the RANs 212A, 212B and 212C include respective base stations 218A/220A, 218B/220B, and 218C/220C. Further the RANs 212A, 212B and 212C service communications for MSs 222A, 222B, and 222C/222D, respectively. BSCs 214A, 214B and 214C include PCFs 216A, 216B and 216C, respectively. BSCs 214A and 214B both couple to MSC/VLR/HLR 224 while BSC 214C couples to MSC/VLR/HLR 226. With this structure, a first service provider operates RANs 212A and 212B while a second service provider operates RAN 212C. However, the same R-P network 202 services both service providers. As is shown in FIG. 2, however, while PDSN 204 supports the first service provider, PDSN 205 supports the second service provider. In another embodiment, each service provider may have its own R-P network.

For a data communication serviced by a RAN, e.g., RAN-3 212C for MS 222D, an R-P tunnel is established between the PDSN 205 and the servicing BSC 214C. While the underlying data communication is comprised of IP packets, the R-P network 202 transmits R-P packets via an R-P tunnel. As will be described in more detail with reference to FIG. 5B, each R-P packet includes an R-P SQL indicator. This R-P SQL indicator not only indicates properties of the encapsulated IP packet but is also used by the R-P network 202 in routing the R-P packet. The R-P network 202 uses the R-P SQL level in determining what service level to provide in routing the R-P packets, in the same or similar manner as an IP network uses the IP SQL indicator in routing IP packets. Routing paths, switching latency, priority with respect to other R-P packets are each factors used by the R-P network 202 in routing R-P packets based upon the R-P SQL level. The R-P SQL may be a specific QOS level or a D-S level, depending upon the particular operation.

Figure 3:
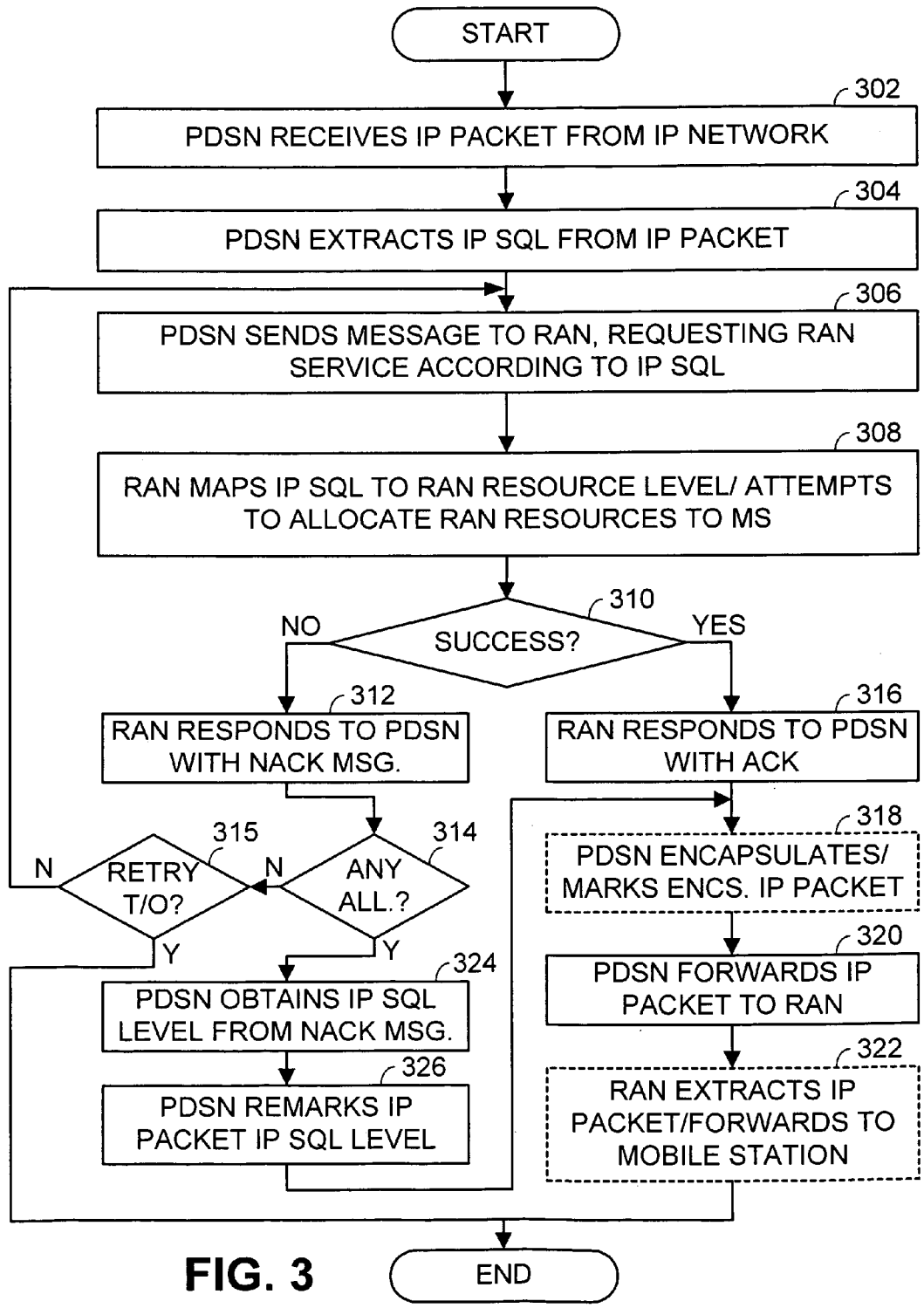
FIG. 3 is a logic diagram generally illustrating operation according to a first embodiment of the present invention in allocating Radio Access Network (RAN) resources to service forward link data transmissions and in servicing the forward link data transmissions.

FIG. 3 is a logic diagram generally illustrating operation according to a first embodiment of the present invention in allocating Radio Access Network (RAN) resources to service forward link data transmissions and in servicing the forward link data transmissions. Operation commences when the PDSN receives an IP packet from the IP network (step 302). Upon receipt of the IP packet, the PDSN extracts a copy of the IP SQL from the IP packet (step 304).

The PDSN then sends a message to the RAN, requesting that the RAN service the transmission of the IP packet to a corresponding MS at the IP SQL (step 306). The RAN (the PCF contained in the corresponding BSC in the embodiment discussed) maps the IP SQL to a corresponding RAN SQL. This RAN SQL may or may not be supported by the MS (step 308). As will be described further with reference to FIGS. 5A, 6 and 7, the IP SQL may be an explicit QOS level or a D-S level. Mapping of the IP SQL to the RAN SQL is dependent upon the type of IP SQL as well as the value of the IP SQL. In one embodiment of the present invention, if the MS does not support the RAN SQL, operation proceeds through step 310 to step 312 where a NACK message is sent to the PDSN, indicating either that no allocation was made or the level of a partial allocation that was made. The PDSN may then respond to the source of the IP packet accordingly, e.g., web server, content server, etc.

If the mapping is successful, i.e., if the requested RAN SQL is assignable to the MS, the RAN attempts to allocate these RAN resources to the MS (step 308). If the RAN resource assignment is successful (as determined at step 310), the RAN responds to the PDSN with an ACK message (step 316). Next, the PDSN encapsulates the IP packet into an R-P packet and optionally marks the R-P packet with an R-P SQL corresponding to the IP SQL (step 318). In the described embodiment, the R-P SQL corresponds directly to the IP SQL. However, in other embodiments, a mapping from the IP SQL to the R-P SQL may be required. The PDSN then forwards the (encapsulated) IP packet to the RAN via the R-P interface (R-P network) (step 320). The RAN receives the (encapsulated) packet, extracts the IP packet, and forwards the IP packet to the MS via a servicing base station.

If no allocation has been attempted because the MS may not be allocated service, or if an allocation had been made but the attempted allocation has failed (as determined at step 314), it is next determined whether the retry timer has timed out (step 315). If so, operation ends. If not, operation returns to step 306.

If a partial allocation has resulted (as determined at step 314), the RAN has already indicated this partial allocation to the PDSN in the NACK message (step 312). This partial allocation may be indicated via a RAN SQL indicator, an R-P SQL indicator, or an IP SQL indicator. In the embodiment illustrated, the BSC/PCF maps the RAN SQL allocated to an IP SQL and provides this IP SQL in the NACK message. The PDSN extracts this IP SQL from the NACK message (step 324) and uses the IP SQL to remark IP packets that are subsequently received for the MS and forwarded to the MS via the R-P network to the RAN (step 326). However, in other embodiments, a mapping must be performed at the PDSN to determine the IP SQL. From step 326, operation proceeds to step 318.

Figure 4:
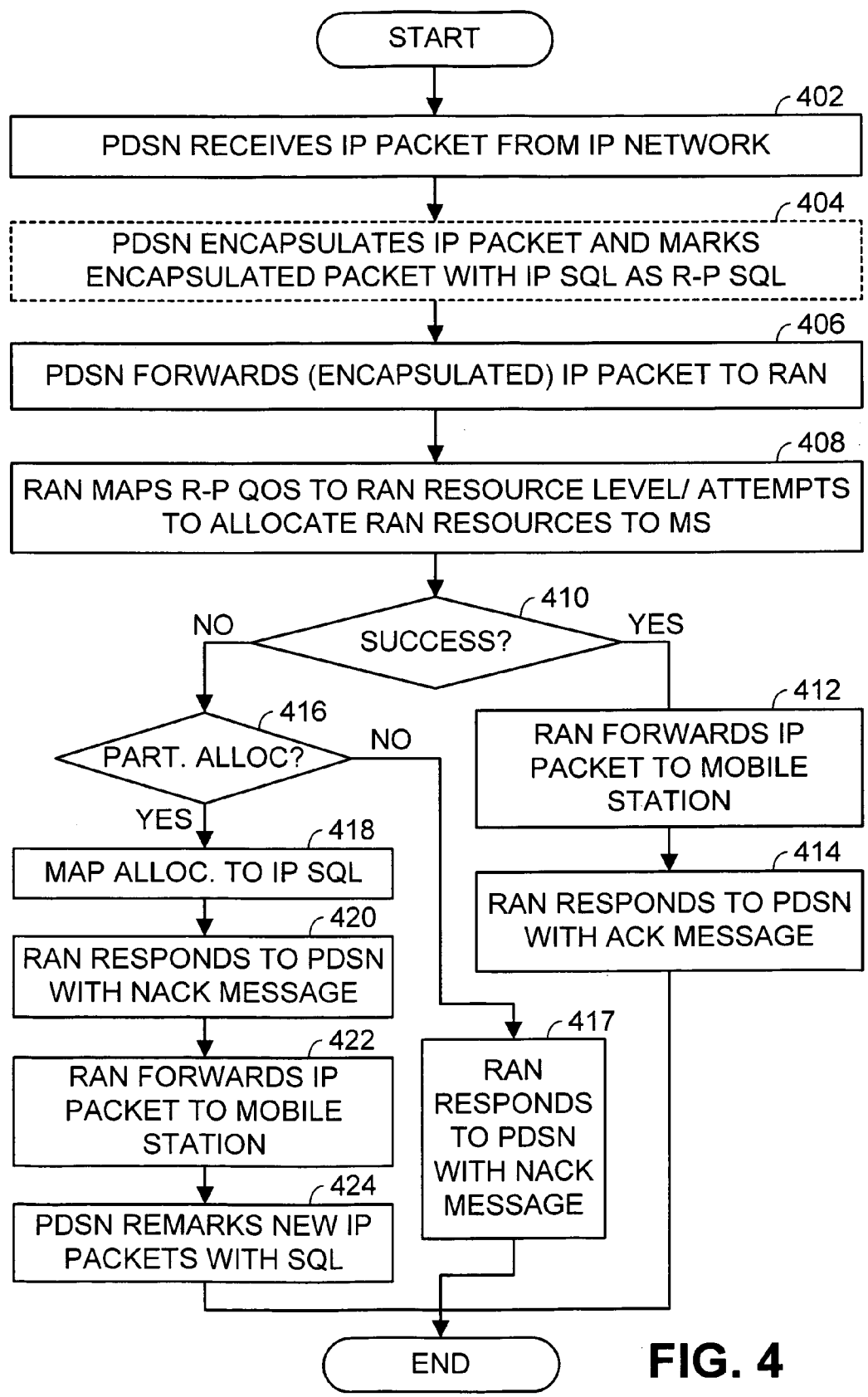
FIG. 4 is a logic diagram generally illustrating operation according to a second embodiment of the present invention in allocating RAN resources to service forward link data transmissions and in servicing the forward link data transmissions.

FIG. 4 is a logic diagram generally illustrating operation according to a second embodiment of the present invention in allocating RAN resources to service forward link data transmissions and in servicing the forward link data transmissions. Operation commences when the PDSN receives an IP packet from the IP network (step 402). The PDSN encapsulates the IP packet into an R-P packet and optionally marks the R-P packet with an R-P SQL corresponding to the IP SQL (step 404). In the described embodiment, the R-P SQL corresponds directly to the IP SQL. However, in other embodiments, a mapping from the IP SQL to the R-P SQL may be required.

The PDSN then forwards the (encapsulated) IP packet to the RAN via the R-P interface (R-P network) (step 406). Upon receipt of the (encapsulated) IP packet, the RAN (the PCF contained in the corresponding BSC in the embodiment discussed) maps the IP SQL to a set of RAN resources supported for the MS. If the mapping is successful, i.e., if the requested RAN resource level is assignable to the MS, the RAN attempts to allocate these RAN resources to the MS (step 408). If the RAN resource assignment is successful (as determined at step 410), the RAN forwards the IP packet to the mobile station (step 412) and responds to the PDSN with an ACK message (step 414).

The requested RAN resource assignment may fail in two manners. In a first manner, the MS does not support any RAN resource assignment that would satisfy the IP SQL. In this case, the mapping fails and no RAN resource allocation is attempted. In a second manner, while the MS supports a set of RAN resources that would satisfy the IP SQL, the RAN resources are unavailable. In both cases, the requested allocation is unsuccessful, as determined at step 410.

If a partial allocation has been made, as determined at step 416, the BSC/PCF maps the allocation (RAN SQL) to produce a corresponding IP SQL (step 418). Then, the RAN sends a NACK message to the PDSN, indicating the IP SQL of a partial allocation that has been made (step 420). The PDSN may then respond to the source of the IP packet accordingly. In such case, the RAN forwards the IP packet to the MS (step 422). Further, the PDSN remarks the IP SQL of new IP packets for the forward link data session to indicate the level of service provided by the RAN (step 424). If no RAN allocation has been made (as determined at step 416), the RAN sends a NACK message to the PDSN, indicating that no allocation was been made (step 417). Then, operation ends.

Some of the operations described with reference to FIG. 4 may be performed in passing further data packets to the MS via the RAN. For example, during an ongoing forward link data communication, the PDSN and BSC/PCF will determine whether the IP SQL corresponds to an existing set of allocated RAN resources. This check may be performed for (1) every forward link IP packet received; or (2) periodically, based upon a time interval, based upon a number of IP packets received, or based upon another decision process.

FIG. 5A is a diagram illustrating a RAN mapping table constructed according to the present invention. As previously described, the SQL that may be provided by the IP network, the R-P network and the RAN may be characterized in differing manners. The SQL may be characterized on the basis of specific quality of service (QOS), upon a differential service (D-S) level, or upon another basis. The table illustrated in FIG. 5A provides one basis for mapping a SQL to the RAN resources that may support such SQL.

In the table of FIG. 5A, RAN SQLs are characterized by a combination of their MAC layer parameters and ranked based upon "precedence" levels. Precedence level 0 provides the best relative performance while precedence level 6 provides the worst relative performance. MAC layer parameters illustrated in FIG. 5A include the radio bandwidth (R/BW), the Frame Error Rate/transmit power level (FER/Pwr), the MAC delay, the MAC timer setting, and the maximum burst size. Corresponding to each precedence level is the value of the MAC layer parameter allocated for the level. Scientific analysis, such as simulations and/or radio resource management analysis is employed to organize the priority levels into their rank order. Using this scientific analysis, the RAN SQL provided at each precedence level may be mapped to a corresponding IP SQL and/or R-P SQL.

When the IP SQL requires specific performance levels, e.g., an IP QOS level, a direct mapping is performed in an attempt to satisfy the IP QOS level. As a first step in mapping, a RAN precedence level is selected that will satisfy the IP QOS level. Then, it is determined whether this RAN precedence level is supported for the MS in question. If RAN precedence level is supported for the MS in question, the RAN will attempt to allocate the RAN resources to meet the RAN precedence level.

In the described embodiment, the RAN supports different precedence levels for different classes of subscribers. For example, gold subscribers are serviced at RAN precedence levels 0, 1 and 2. Further, silver subscribers are serviced at RAN precedence levels 2, 3 and 4. Finally, bronze subscribers are serviced at RAN precedence levels 4, 5, and 6. Thus for each subscriber class, differing precedence levels are supported. As a general rule, in allocating RAN resources to meet an IP QOS level, a highest precedence level that meets the IP QOS level will be allocated. Thus, for example, while a gold subscriber may be allocated resources at precedence levels 0, 1 and 2, an IP QOS level request that may be satisfied at precedence level 2 will be allocated at precedence level 2, instead of at precedence level 0 or 1. Such allocation is made to conserve RAN resources.

By having multiple precedence levels defined for each MS, a D-S level mapping may be performed. For example, consider a D-S level system in which low, medium, and high levels of service are provided. In mapping a medium D-S level to RAN resources for a gold subscriber, precedence 1 level allocation will. Likewise, a high D-S level maps to precedence level 0 while a low D-S level maps to precedence level 2. For a silver subscriber, precedence levels 2, 3 and 4 are supported. Thus, mapping of a D-S level for a silver subscriber would be to one of these three precedence levels. Note that overlap in RAN SQL precedence levels exists for the differing subscriber levels.

Currently the Radio Access Network (RAN) provides a different set of SQL indicators from those of the IP network (DiffServ). The Priority is defined in the subscriber profile that is stored in the HLR/VLR to indicate service differentiation among mobile users. But Priority does not distinguish different applications for the same user. Hence, an intermediate parameter is introduced to the BSC/PCF in this invention to bridge the gap between RAN SQL indicator (Priority) and DiffServ SQL indicator (DS codepoint). The user of a specific Priority ("Gold" for instance) may run different applications that require different SQL. To support different SQL among different applications, each application will have a different Precedence that mapped to different physical resources and MAC layer parameters. Unlike Priority that is part of the subscriber profile, Precedence is a MAC layer parameter and stored in RRM function of the BSC/PCF. Also Priority is associated with a user class, but Precedence provides a finer granularity of SQL within a user class.

Access to subscriber profile, including Priority typically occurs during the mobile registration process. Thus it happens prior to the mapping process. Also there is a distinction between Priority and Precedence in this invention.

Figure 5B:
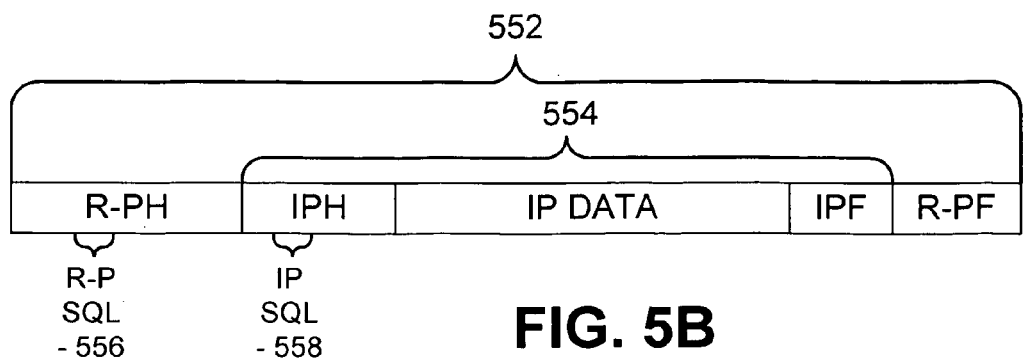
FIG. 5B is a block diagram illustrating an IP packet that is encapsulated within an R-P packet according to the present invention.

FIG. 5B is a block diagram illustrating an IP packet (and other underlying protocol structure) that is encapsulated into an R-P packet according to the present invention. As was previously discussed with reference to FIGS. 1–4, IP packets are encapsulated prior to their transmission via the R-P network/R-P interface/R-P tunnel, as the case may be. As is shown, an IP packet 554 includes an IP header, IP data, and an IP footer. Contained in the IP header is an IP SQL indicator. This IP SQL indicator 558 may indicate an IP QOS for the IP packet 554 or a D-S level for the IP packet 554.

The IP packet 554 is encapsulated within an R-P packet 552 that includes an R-P header and an R-P footer. The R-P header includes an R-P SQL indicator 556. The R-P SQL indicator 556 may be a QOS indicator that indicates a required service level or a D-S level indicator that indicates a D-S level of service to be provided by the R-P network/R-P interface/R-P tunnel.

As has been described, in one operation, the PDSN receives an IP packet from the IP network, extracts the IP SQL indicator 558, encapsulates the IP packet within an R-P packet, marks the R-P packet with an R-P SQL 556 indicator corresponding to the IP SQL indicator 558 and transmits the R-P packet to a BSC. In another operation, the PDSN remarks the IP SQL indicator 558 based upon the R-P SQL (or IP SQL) provided in a NACK message. For reverse link operations, the PDSN may also remark the IP SQL indicator 558 based upon the R-P SQL 556 provided when the R-P packet 552 is a reverse link packet.

Figure 6:
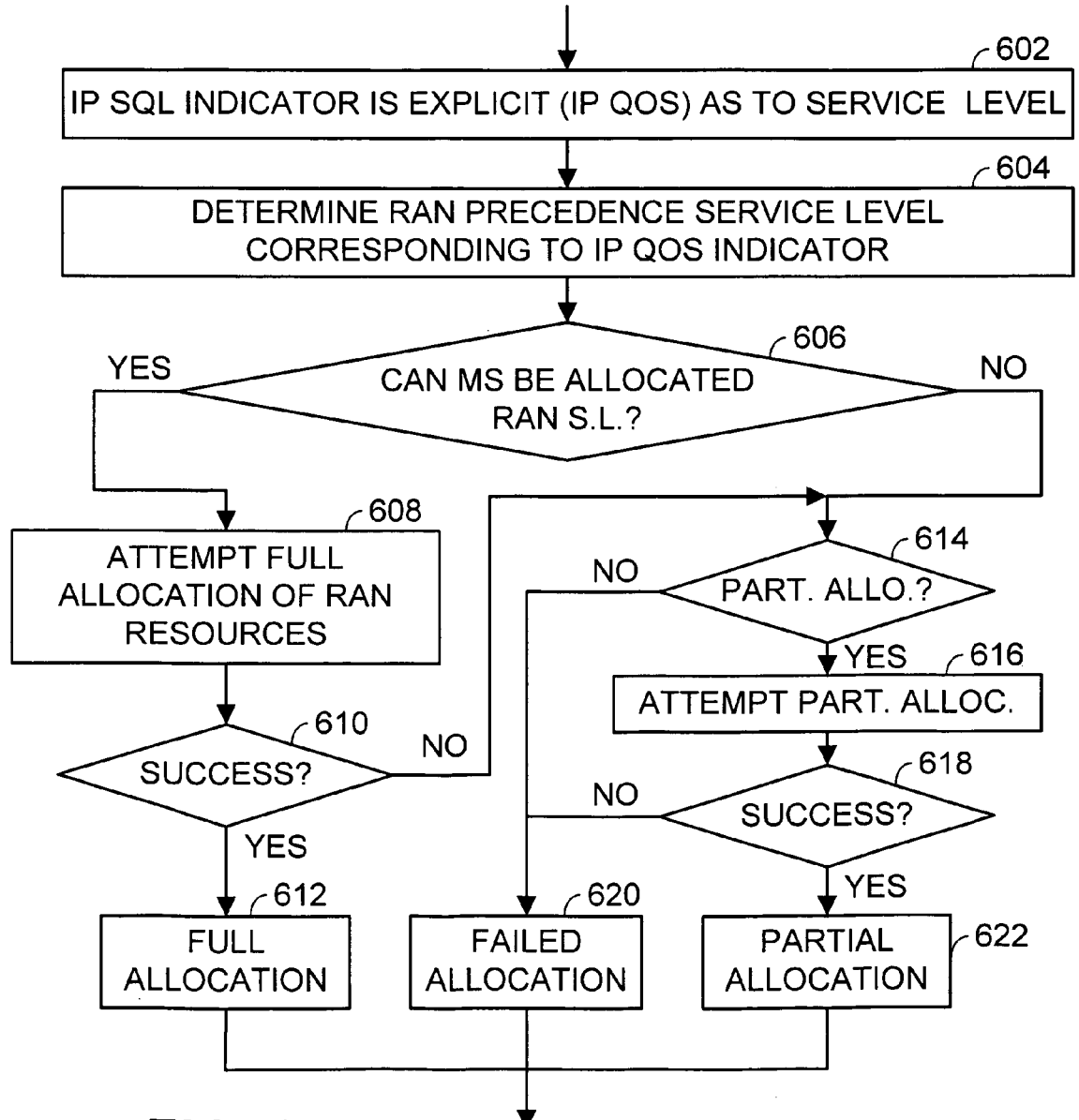
FIG. 6 is a logic diagram illustrating operation according to the present invention in mapping an explicit IP service quality level to RAN resources and in attempting allocation of RAN resources in accordance therewith.

FIG. 6 is a logic diagram illustrating operation according to the present invention in mapping an explicit IP QOS level to RAN resources and in attempting allocation of RAN resources in accordance therewith. As a first step in this operation, the BSC (PCF) receives a request to transmit an IP packet to an MS, wherein the associated IP SQL is an explicit IP QOS level (step 602). Upon receipt and such determination, the BSC (PCF) maps the IP QOS level to a RAN precedence level of the type discussed with reference to FIG. 5A (step 604). In performing this mapping, the BSC (PCF) may access the VLR and/or HLR servicing the MS. Such is the case because the precedence levels supported by the MS, or the subscriber class to which the MS subscribes may be stored in the VLR or HLR. Further, while the BSC (PCF) performs the mapping operations in the described embodiment, the BSC (PCF) may at times access the VLR or HLR while performing mapping operations to retrieve data relating to the RAN.

It is next determined whether the MS can be allocated RAN resources that will satisfy the IP QOS level (step 606). As was previously discussed with reference to FIGS. 3 and 4, only if the MS subscribes to the level of service required to service the IP QOS level, will the RAN attempt allocation of resources. If the MS can be allocated the RAN service level, the RAN attempts a full allocation of these resources to the MS (step 608). If the allocation is successful, as determined at step 610, the full allocation is provided (step 612) and operation continues.

If it is determined at step 606 that an allocation that is sufficient to service the IP QOS level is not supported by the MS subscriber level, it is then determined whether a partial allocation should be attempted (step 614). Step 614 is also reached if, at step 610, a full allocation of resources was unsuccessful (step 610). A determination to make a partial resource allocation is followed by a partial resource allocation attempt (step 616). If this partial resource allocation attempt is unsuccessful, or if it was decided not to attempt a partial allocation at step 614, a failed allocation results (step 620). However, if the partial allocation attempt is successful (as determined at step 618), a partial allocation results (step 622) and further steps are taken in accordance therewith.

Figure 7:
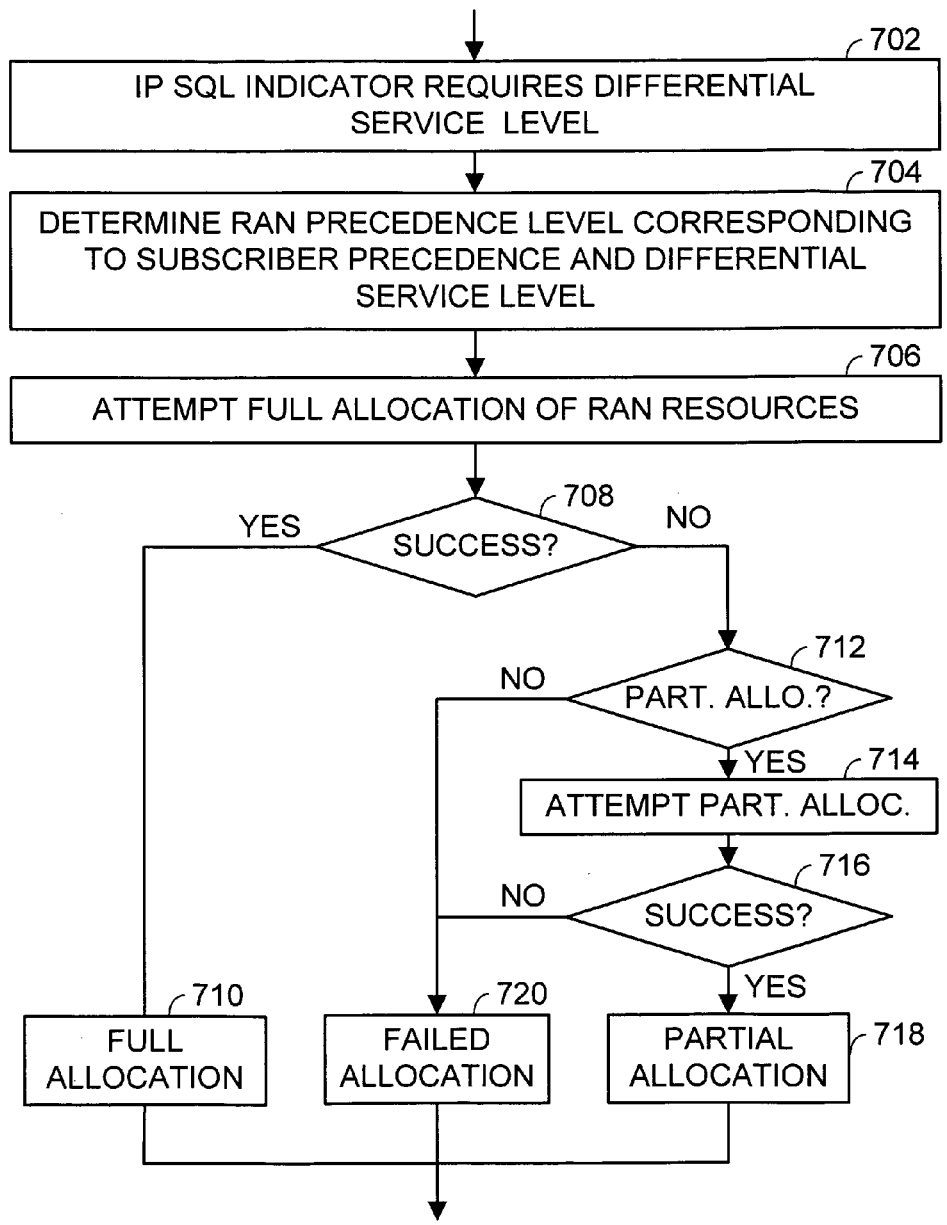
FIG. 7 is a logic diagram illustrating operation according to the present invention in mapping a differential IP service quality level to RAN resources and in attempting allocation of RAN resources in accordance therewith.

FIG. 7 is a logic diagram illustrating operation according to the present invention in mapping a differential IP SQL to RAN resources and in attempting allocation of RAN resources in accordance therewith. As a first operation, the BSC (PCF) extracts an IP SQL indicator and determines that the corresponding request requires a differential service level (step 702). The BSC (PCF) then maps the D-S level to a corresponding subscriber precedence level (step 704). Referring to FIG. 5A, for example, a serviced MS is subscribed at a silver subscriber level. The silver subscriber level supports precedence levels 2, 3, and 4. The D-S level requested is for a medium differential service level. Thus, a mapping to precedence level 3 results for a full allocation. Resultantly, the BSC attempts a full allocation of RAN resources at the precedence level 3 (step 706).

If the attempted allocation is successful, as determined at step 708, a full allocation results (step 710) and operation proceeds accordingly. If the allocation attempt is unsuccessful, the BSC (PCF) determines whether a partial allocation is attempted (step 712). If not, the allocation fails (step 720) and operation proceeds accordingly. If so, a partial allocation is attempted (step 714). If the partial allocation is successful, as determined at step 716, operation proceeds according to the partial allocation (step 718). If not, operation proceeds to step 720.

Figure 8:
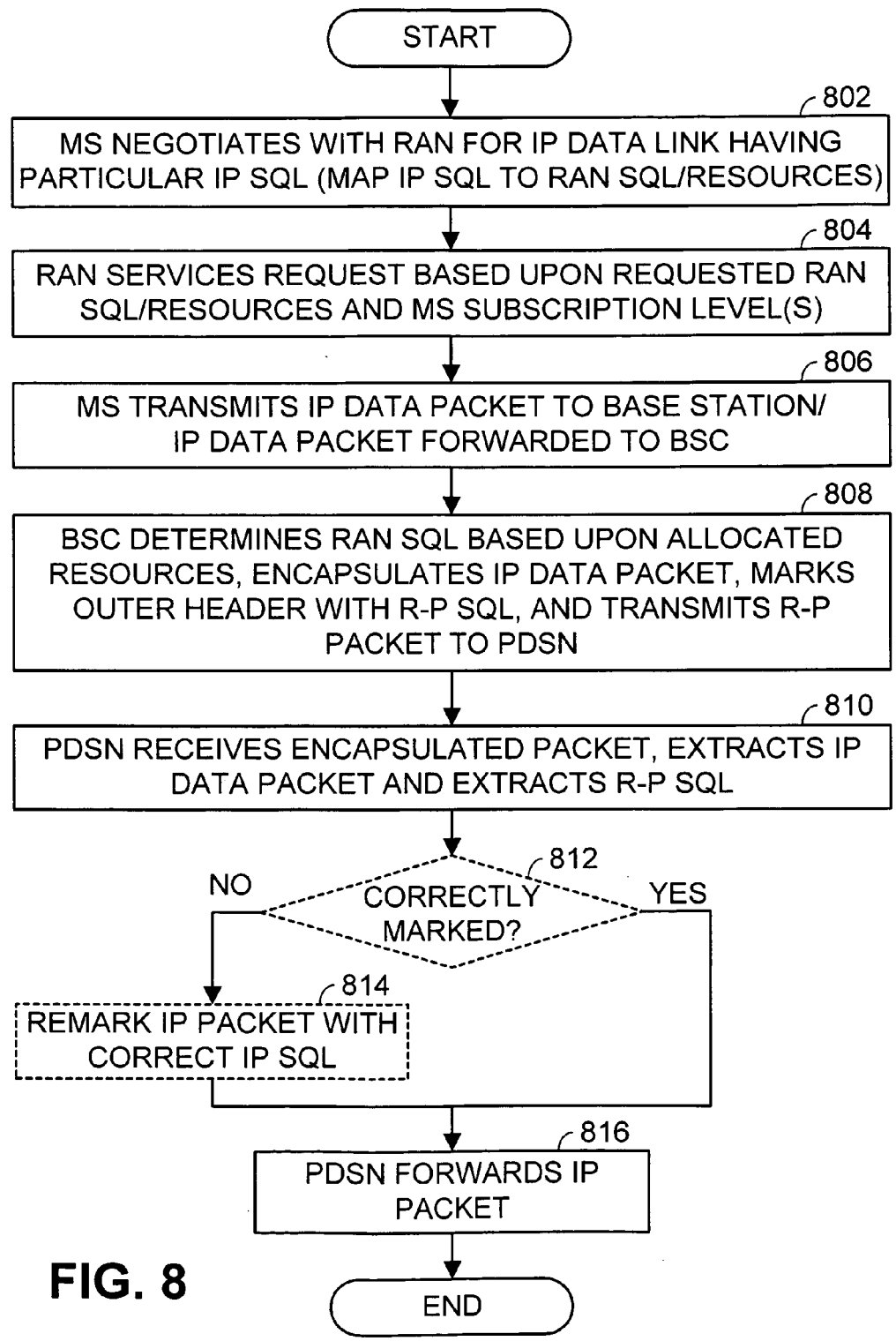
FIG. 8 is a logic diagram illustrating operation according to the present invention in allocating RAN resources to service reverse link data transmissions and in servicing the reverse link data transmissions.

FIG. 8 is a logic diagram illustrating operation according to the present invention in allocating RAN resources to service reverse link data transmissions and in servicing the reverse link data transmissions. A mobile station operating in the service area of the RAN runs applications that require IP communications with remote computers, e.g., the web server 118 and content server 120 of FIG. 1. When the MS determines that a reverse link data path is required to service an IP packet data communication, the MS negotiates with the RAN (via a servicing base station) for an IP data link having a particular IP SQL (step 802).

The MS may itself map the IP SQL to a particular set of RAN resources (particular precedence level as illustrated in FIG. 5A) or may pass the IP SQL to the BSC in a service request. In such case, the BSC would then map the IP SQL to a precedence level identifying a particular set of RAN resources. As was previously described with reference to forward link transmissions with reference to FIGS. 6 and 7, the IP SQL may map to a specific IP QOS level or to a D-S level. Mapping to particular RAN resources is performed accordingly.

With the mapping accomplished, the RAN services the request based upon the requested RAN resources and whether the MS may be allocated such RAN resources (step 804). As was described with reference to FIG. 5A, not all subscribers may access all precedence levels supported by the RAN. Thus, a full or partial allocation of the RAN resources may be provided. With at least some RAN resources allocated, the MS transmits an IP data packet to the base station and the base station forwards the IP packet to the servicing BSC (PCF) (step 806). Upon receipt, the BSC determines the RAN resources that have been allocated to the MS for the data transmission, maps these allocated resources to a corresponding R-P SQL, encapsulates the IP data packet into an R-P packet, marks the R-P packet with the R-P SQL, and transmits the R-P packet to the PDSN across the R-P interface/network/tunnel (step 808).

If all requested RAN resources have been allocated, the R-P SQL will correspond directly to the IP SQL. However, if a partial set of the requested RAN resources has been allocated, the R-P SQL will differ from the IP SQL. Thus, the R-P SQL serves a dual purpose here. First, the R-P SQL provides a check for the validity of the marked IP SQL. Second, the R-P SQL serves to relay the IP SQL to the PDSN.

The PDSN then receives the R-P packet, extracts the IP packet from the R-P packet, and also extracts the R-P SQL from the header of the R-P packet (step 810). The PDSN then optionally determines whether the IP SQL is correctly marked (step 812). If the IP SQL is correct, the PDSN forwards the IP packet to the IP network (step 816). If not, the PDSN remarks the IP SQL of the IP packet to correspond to the R-P SQL (step 814) and forwards the remarked IP packet to the IP network (step 816).

Figure 9:
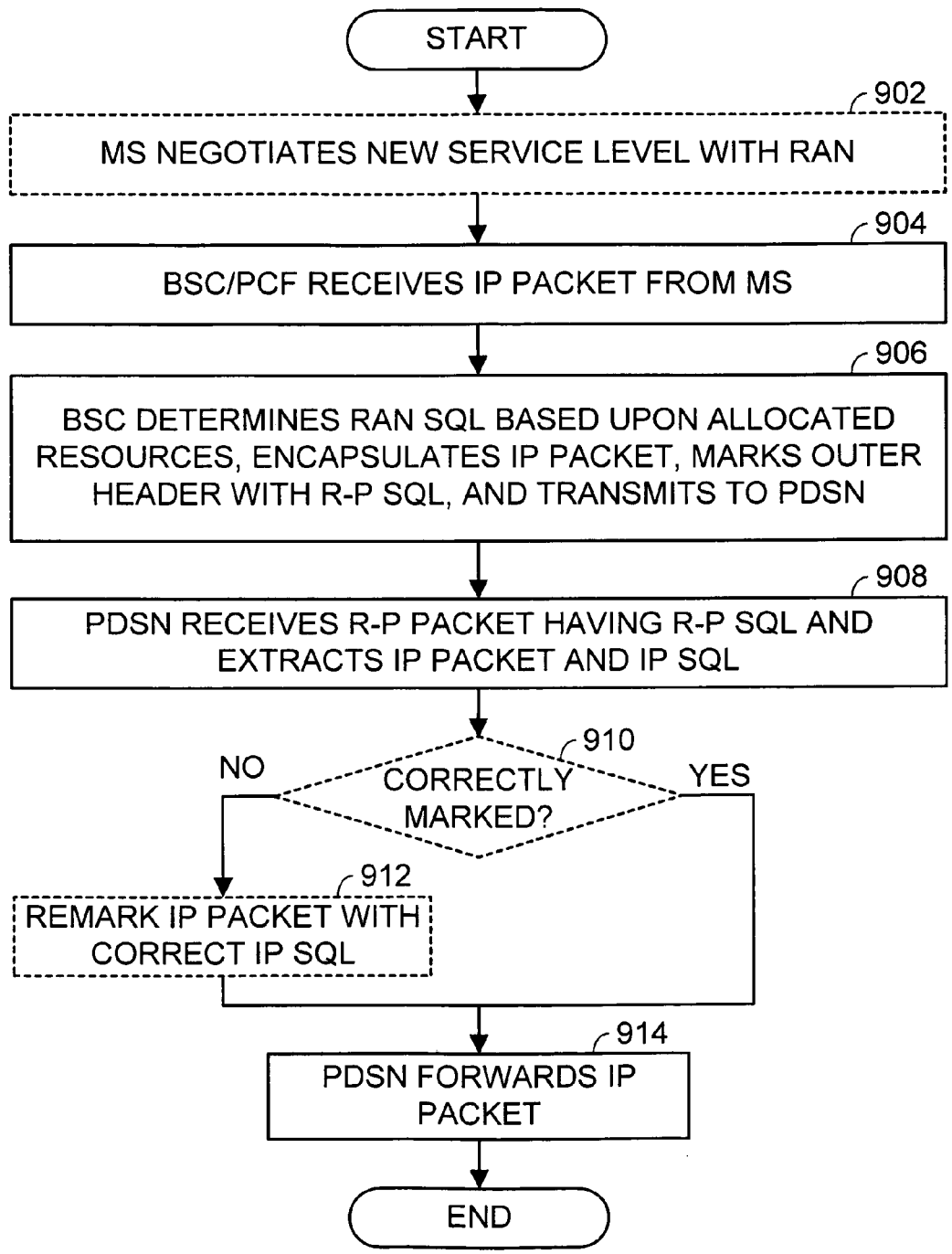
FIG. 9 is a logic diagram illustrating operation according to the present invention in verifying mobile station IP service quality level (SQL) marking while servicing reverse link data transmissions.

FIG. 9 is a logic diagram illustrating operation according to the present invention in verifying mobile station IP SQL marking while servicing reverse link data transmissions. Such operation may be initiated in response to a MS renegotiating a level of reverse link service provided by the RAN (step 902). However, in normal operation, the BSC (PCF) performs these operations for either (1) every reverse link IP packet received; or (2) periodically, based upon a time interval, based upon a number of IP packets received, or based upon another decision process.

When the BSC (PCF) receives the IP packet from the MS (step 904), the BSC (PCF) determines the RAN SQL based upon the RAN resources that have been allocated to the MS and the MS subscriber level (step 906). The RAN SQL may be a specific QOS level or a D-S level. The BSC then encapsulates the IP packet into an R-P packet, marks the R-P packet with a corresponding R-P SQL indicator, and transmits the R-P packet to the PDSN (also step 906). The PDSN then receives the R-P packet, extracts the IP packet, and extracts the IP SQL (step 908).

Optionally, the PDSN then determines whether the IP SQL of the IP packet is correctly marked (step 910). The MS marked the IP packet with the IP SQL when it created the IP packet. Subsequently allocated RAN resources that now service the transmission of the IP packet may not be allocated at a level that corresponds to the IP SQL. However, the R-P SQL corresponds directly to the allocated RAN resources (RAN SQL) and is assumed to be correct. Thus, the R-P SQL is used to check the validity of the IP SQL.

In one operation, the PDSN first accesses the user's profile to determine whether the marked IP SQL is allowed for the MS. If it is, the PDSN will process the packet using the MS's SQL marking and ignore the SQL indicator from the RAN. If the MS's SQL marking is not allowed by the MS's user profile, the PDSN will remark the packet either using the RAN SQL, as a default, or another SQL value deemed appropriate. If the IP SQL is correct in the IP packet, the PDSN forwards the IP packet to the IP network (step 914). Otherwise, the PDSN remarks the IP packet with the correct IP SQL (corresponding to the R-P SQL) and then forwards the IP packet to the IP network (step 914).

Figure 10:
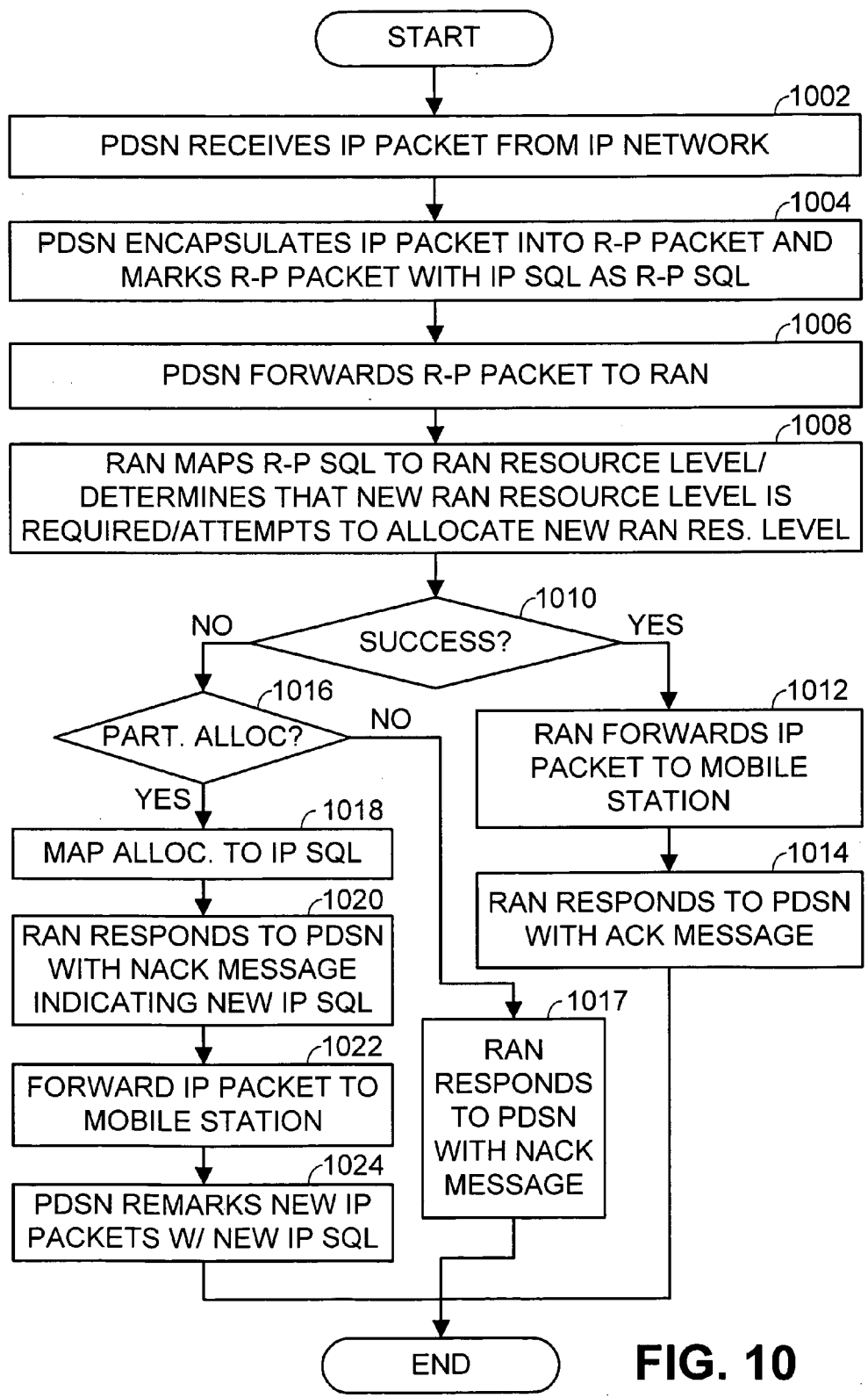
FIG. 10 is a logic diagram illustrating operation according to a first embodiment of the present invention in updating the allocation of forward link RAN resources in response to an updated IP SQL indicator.

FIG. 10 is a logic diagram illustrating operation according to a first embodiment of the present invention in updating the allocation of forward link RAN resources in response to an updated IP SQL indicator. Operation commences when the PDSN receives an IP packet from the IP network (step 1002). The PDSN encapsulates the IP packet into an R-P packet and marks the R-P packet with an R-P SQL corresponding to the IP SQL (step 1004). The PDSN then forwards the R-P packet to the RAN via the R-P interface/network/tunnel (step 1006). The BSC of the RAN receives the R-P packet, extracts the IP packet and maps the R-P SQL to a RAN resource level, e.g., as described with respect to FIG. 5A. The BSC (PCF) then determines that a new RAN resource level is required and attempts to allocate the new RAN resource level (step 1008).

If the allocation of the new RAN resource level is successful, as determined at step 1010, the RAN forwards the IP packet to the MS via a serving base station (step 1012). The RAN also responds to the PDSN with an ACK message indicating that the BSC serviced the IP packet at the new IP SQL (step 1014). Then, operation ends.

If the new RAN resource level allocation is unsuccessful, as determined at step 1010, the BSC (PCF) next determines whether a partial assignment of RAN resources has been made (step 1016). If no RAN resources have been allocated, as determined at step 1016, the BSC (PCF) responds with a NACK message to the PDSN indicating that no allocation was made (step 1017) and operation ends. If a partial allocation of RAN resources has been made, the BSC (PCF) maps the allocated RAN resource level to an IP SQL (step 1018). The RAN then responds to the PDSN with a NACK message indicating the new IP SQL. The BSC then forwards the IP packet to the MS via a serving base station (step 1022). Further, based upon the contents of the NACK message, the PDSN remarks subsequently received IP packets on the forward link with the new IP SQL (step 1024). From step 1024 operation according to FIG. 10 ends. The steps of FIG. 10 may be performed for every IP packet received by the PDSN. Alternately, the steps of FIG. 10 may be performed periodically on a time basis, on an IP packet volume basis, or upon another basis, as well.

Figure 11:
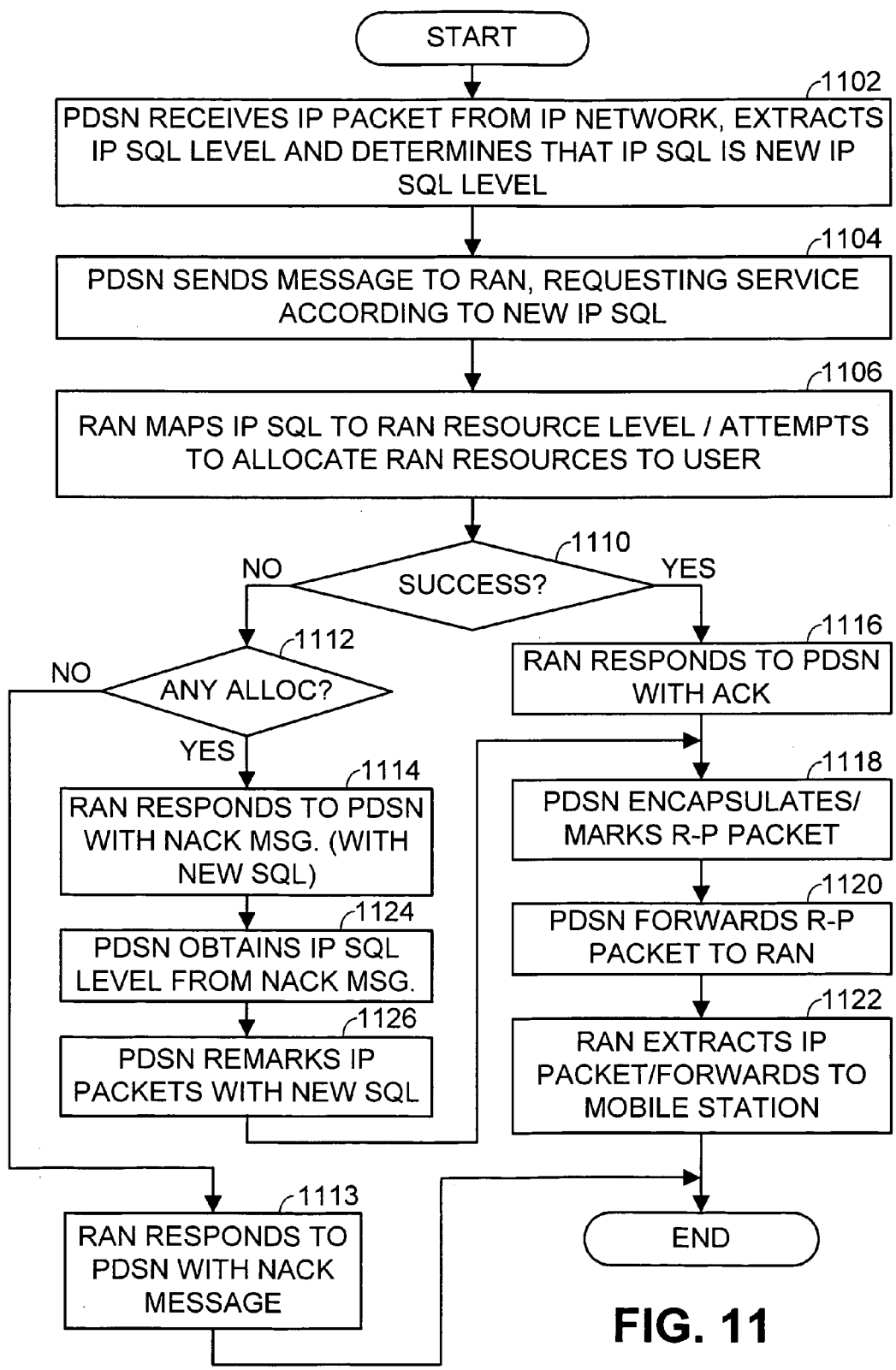
FIG. 11 is a logic diagram illustrating operation according to a second embodiment of the present invention in updating the allocation of forward link RAN resources in response to an updated IP SQL indicator.

FIG. 11 is a logic diagram illustrating operation according to a second embodiment of the present invention in updating the allocation of forward link RAN resources in response to an updated IP SQL indicator. Operation commences when the PDSN receives an IP packet from the IP network, extracts the IP SQL and determines that the IP SQL is a new IP SQL as compared to a previous IP SQL for an ongoing IP data session (step 1102). The PDSN then sends a message to the BSC of the RAN and requests that the RAN allocate a new service level according to the new IP SQL (step 1104). In response to the message, the BSC of the RAN maps the new IP SQL to a RAN resource level (according to the description of FIG. 5A, for example) and attempts to allocate this level of RAN resources (step 1106).

If the RAN resource allocation is successful, as determined at step 1110, the RAN responds to the PDSN with an ACK message (step 1116). The PDSN then encapsulates the IP packet into an R-P packet, marks the R-P packet with an R-P SQL corresponding to the IP SQL (step 1118) and forwards the R-P packet to the serving BSC of the RAN (step 1120). The BSC then extracts the IP packet and forwards the IP packet to the corresponding MS via a serving base station (step 1122).

If the new RAN resource level allocation is unsuccessful, as determined at step 1110, the BSC (PCF) next determines whether any RAN resource allocation has been made (step 1112). If not, the BSC (PCF) responds to the PDSN with a NACK message (step 1113), indicating that no allocation has been made. Then, operation ends. If a partial allocation has been made, as determined at step 1112, the BSC (PCF) maps the allocated RAN resource level to an IP SQL and responds to the PDSN with a NACK message indicating the new IP SQL (step 1114). The PDSN then obtains the IP SQL from the NACK message (step 1124) and remarks the IP packet (and subsequent IP packets) with the new IP SQL (step 1126). Operation then continues to step 1118.

Figure 12:
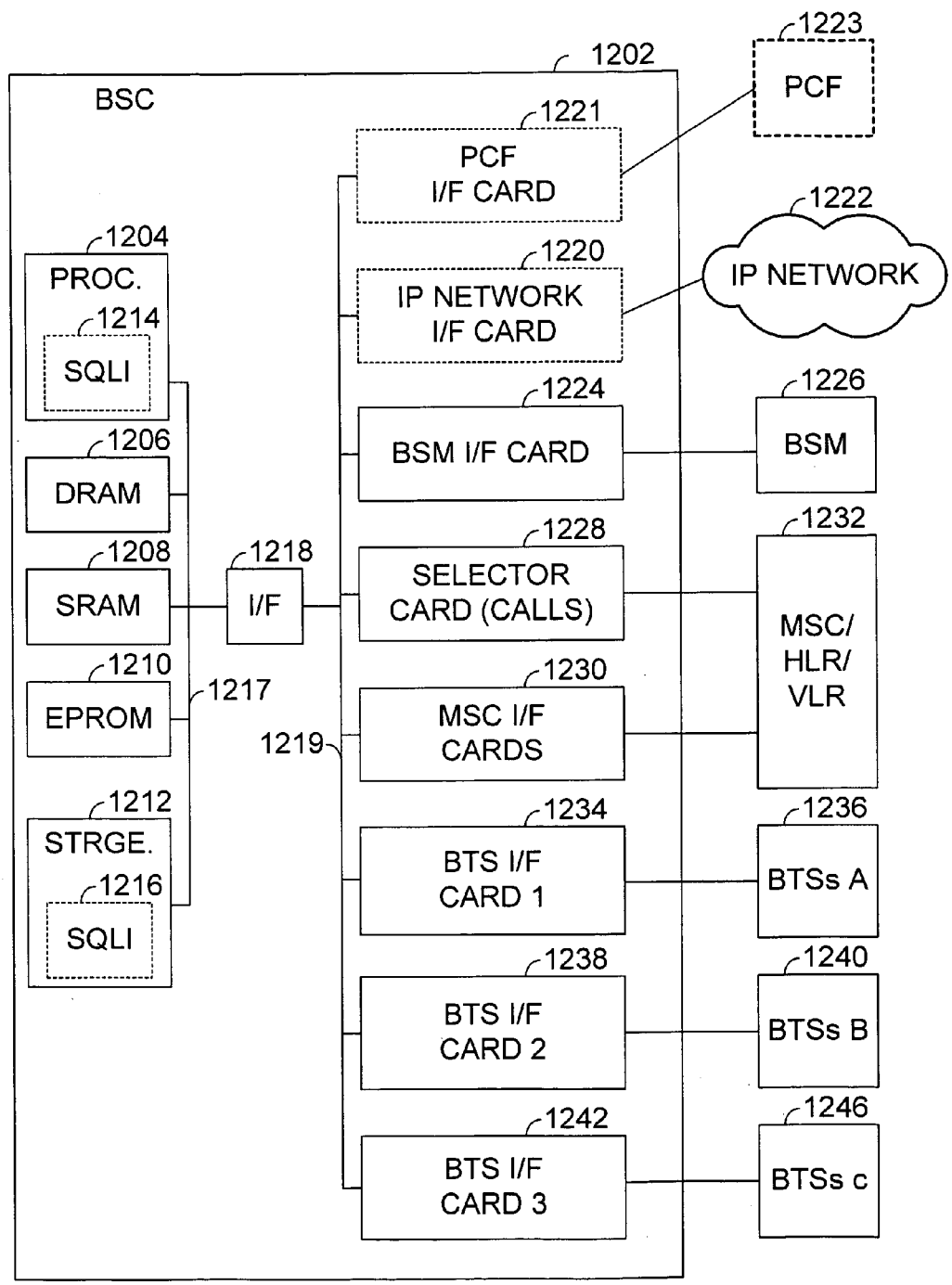
FIG. 12 is a block diagram illustrating a Base Station Controller (BSC) constructed according to the present invention.

FIG. 12 is a block diagram illustrating a Base Station Controller (BSC) 1202 constructed according to the present invention. The structure and operation of BSCs is generally known. The BSC 1202 services both circuit switched and packet switched operations. In some cases, the BSC 1202 is called upon to convert data between circuit switched and data switched formats, depending upon the types of equipment coupled to the BSC 1202. The components illustrated in FIG. 12, their function, and the interconnectivity may vary without departing from the teachings of the present invention.

The BSC 1202 includes a processor 1204, dynamic RAM 1206, static RAM 1208, EPROM 1210 and at least one data storage device 1212, such as a hard drive, optical drive, tape drive, etc. These components intercouple via a local bus 1217 and couple to a peripheral bus 1219 via an interface 1218. Various peripheral cards couple to the peripheral bus 1219. These peripheral cards include an IP (or R-P) network interface card 1220, a base station manager card 1224, at least one selector card 1228, a MSC interface card 1230, and a plurality of BTS interface cards 1234, 1238 and 1242.

The IP network interface card 1220 couples the BSC 1202 to an IP network 1222 (or to the R-P network). The base station manager interface card 1224 couples the BSC 1202 to a Base Station Manager 1226. The selector card 1228 and MSC interface card 1230 couple the BSC 1202 to the MSC/HLR/VLR 1232. the BTS interface cards 1234, 1238, and 1242 couple the BSC 1202 to base stations served by Base station Transceiver Subsystems (BTSs) 1236, 1240, and 1246, respectively.

In another embodiment of the present invention, the PCF 1223 is implemented separately from the BSC 1202. In such case, the BSC 1202 couples to the PCF 1223 via a PCF I/F card 1221. As will be further described with reference to FIG. 14, some of the functions of the present invention are performed by the PCF 1223 in the embodiment.

Service Quality Level Instructions (SQLI), along with the BSC 1202 hardware, enable the BSC 1202 to perform the operations of the present invention. The SQLI 1216 are loaded into the storage unit 1212 and, upon their execution, some or all of the SQLI 1214 are loaded into the processor 1204 for execution. During this process, some of the SQLI 1216 may be loaded into the DRAM 1206.

Figure 13:
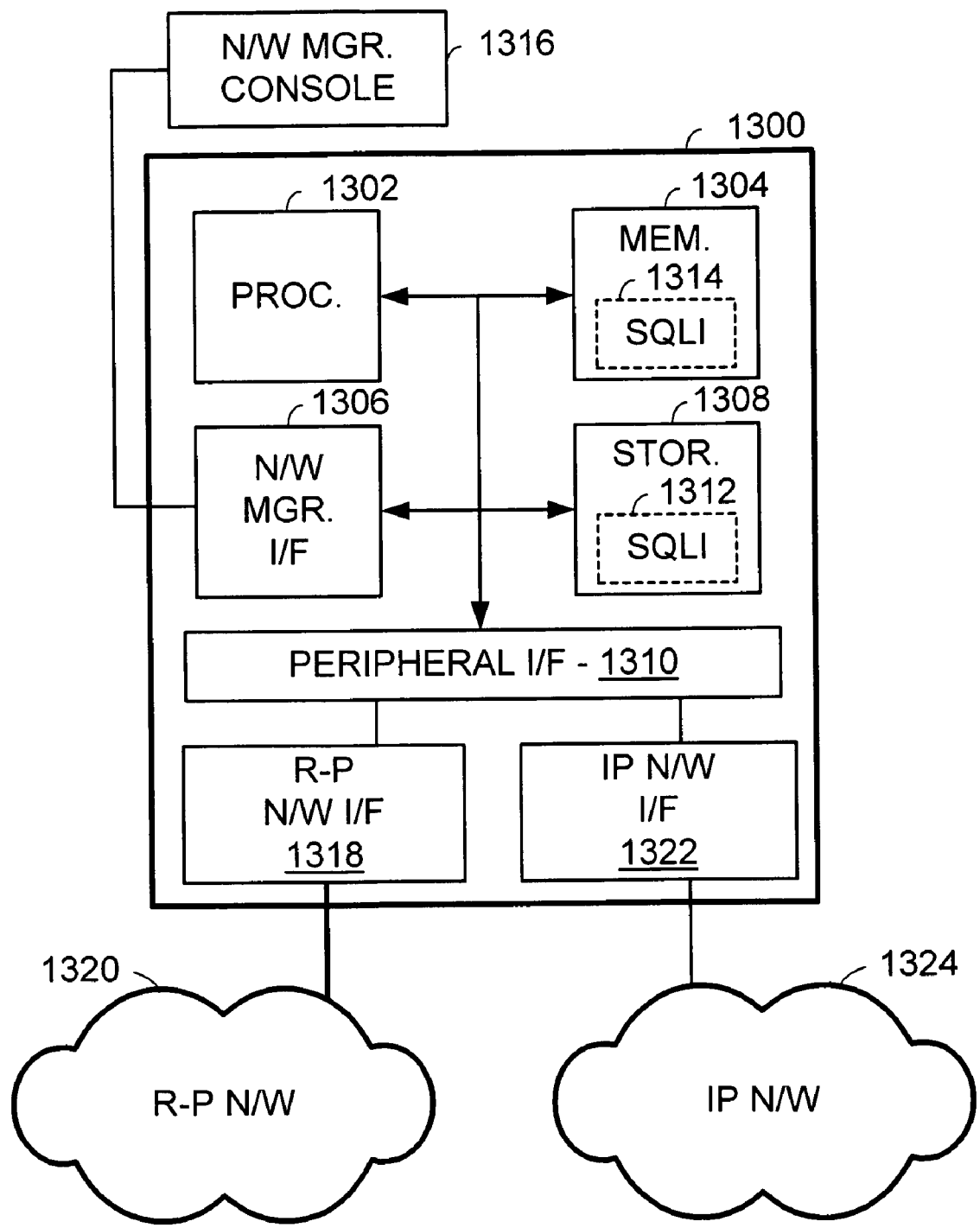
FIG. 13 is a block diagram illustrating a Packet Data Serving Node (PDSN) constructed according to the present invention.

FIG. 13 is a block diagram illustrating a Packet Data Serving Node (PDSN) 1300 constructed according to the present invention. The PDSN 1300 may be general-purpose computer that has been programmed and/or otherwise modified to perform the particular operations described herein. However, the PDSN 1300 may be specially constructed to perform the operations described herein. In particular, the PDSN 1300 may be the PDSN 114 shown in FIG. 1 or the PDSN 204 illustrated in FIG. 2 that executes some of the operations described with reference to FIGS. 3–4 and 8–11.

Apart from the functions of the present invention, the PDSN 1300 performs functions that are basically the same as those performed by the Network Access Server (NAS) in data networks. A NAS is the entry point to the network and provides the end user with access to network services. In a CDMA2000 system, the PDSN is the entry point to the public data network for MSs. The PDSN resides on the network edge and controls access to network services.

A NAS typically accepts point-to-point connections on a set of client interfaces and provides access to routed networks on a separate set of network interfaces. The NAS provides network access based on the user identity and the policies of the service provider. Although a NAS typically includes routing functionality, it is not simply a router. It provides and accounts for services on a per-user basis, and is the point at which users are authenticated, access policy is enforced, and network services are authorized. A NAS is typically the first point in a network where security measures and policies are en-forced. With these controls, it limits usage to appropriate levels based on the available network bandwidth or service provider agreements. The PDSN typically provides the following functions in a cdma2000 network:

Establishes, maintains and terminates logical links to the RN across the R-P interface;

Establishes, maintains and terminates PPP link with the mobile node;

Initiates Authentication, Authorization and Accounting (AAA) for the mobile node client to the AAA server;

Receives service parameters for the mobile node client from the AAA server;

Collects usage data for accounting purposes to be relayed to the AAA server; and Routes packets to/from external packet data networks.

An IP Operating System resides in the PDSN and supports the essential functions including queuing, firewalling, accounting, policing, traffic shaping, encryption, DiffServ, and VPNs. A Subscriber Service Policy Manager resides in N/W MGR. It maintains Service Level Quality policy and subscriber specific information (such as user id, service profile). The SQL policies are translated into software instructions and are executed by the PDSN when required. When processing IP packets, the operating system typically also executes SQL instructions.

The PDSN 1300 includes a processor 1302, memory 1304, a network manager interface 1306, storage 1308 and a peripheral interface 1310, all of which couple via a processor bus. The processor 1302 may be a microprocessor or another type of processor that executes software instructions to accomplish programmed functions. The memory 1304 may include DRAM, SRAM, ROM, PROM, EPROM, EEPROM or another type of memory in which digital information may be stored. The storage 1308 may be magnetic disk storage, magnetic tape storage, optical storage, or any other type of device, which is capable of storing digital instructions and data.

The network manager interface 1306 couples to a network manager console 1316, which allows a network manager to interface with the PDSN 1300 via a network manager console 1316. The network manager console 1316 may be a keypad/display or may be a more complex device, such as a personal computer, which allows the manager to interface with the PDSN 1300. However, the network manager may interface with the PDSN 1300 using other techniques as well, e.g., via a card coupled to the peripheral interface 1310.

The peripheral interface 1310 couples to an R-P network interface 1318 and to an IP network interface 1322. The R-P network interface 1318 couples the PDSN 1300 to the R-P network 1320. The IP network interface 1322 couples the PDSN 1300 to an IP network 1324, e.g., a combination of the Internet, Intranets, LANs, WANs, etc. The IP network 1324 is shown generally as the IP network 116 of FIG. 1 and the Packet Data Networks 206 of FIG. 2. The IP network 1324 may be either of these networks or another packet switched network.

Service Quality Level Instructions (SQLI) 1312 are loaded into the storage 1308 of the PDSN 1300. Upon their execution, a portion of the SQLI 1312 is downloaded into memory 1304 (as SQLI 1314). The processor 1302 then executes the SQLI 1314 to perform the operations described herein performed by the PDSN 1300. The programming and operation of digital computers is generally known to perform such steps. Thus, the manner in which the processor 1302 and the other components of the PDSN 1300 function to perform these operations are not further described herein.

Figure 14:
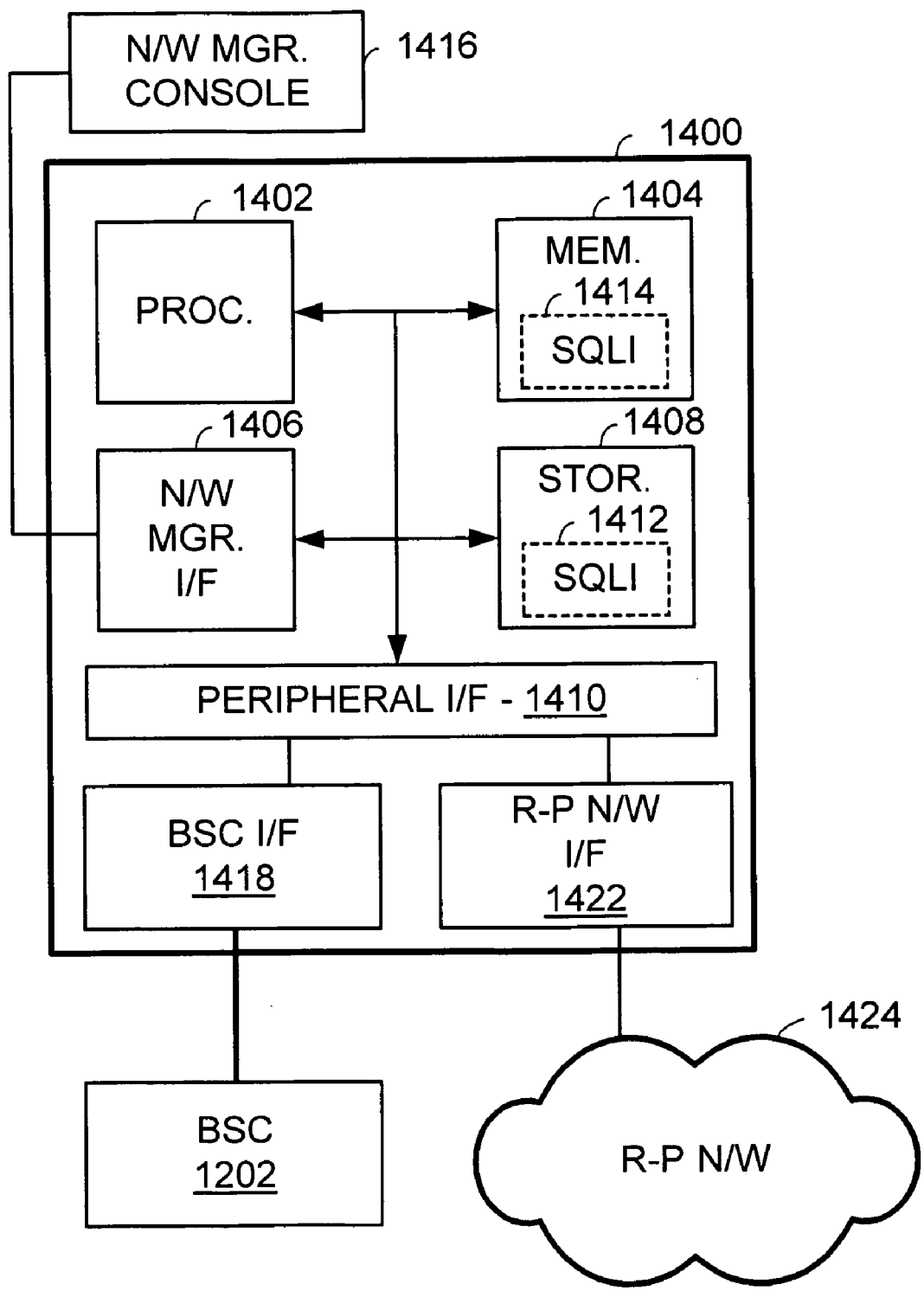
FIG. 14 is a block diagram illustrating a Packet Control Function (PCF) constructed according to the present invention.

FIG. 14 is a block diagram illustrating a Packet Control Function (PCF) 1400 constructed according to the present invention. The PCF 1400 may be general-purpose computer that has been programmed and/or otherwise modified to perform the particular operations described herein. However, the PCF 1400 may be specially constructed to perform the operations described herein. In particular, the PCF 1400 may be the PCF 111B shown in FIG. 1 or the PCF 1223 illustrated in FIG. 12 that executes some of the operations described with reference to FIGS. 3–4 and 8–11.

The PCF 1400 includes a processor 1402, memory 1404, a network manager interface 1406, storage 1408 and a peripheral interface 1410, all of which couple via a processor bus. The processor 1402 may be a microprocessor or another type of processor that executes software instructions to accomplish programmed functions. The memory 1404 may include DRAM, SRAM, ROM, PROM, EPROM, EEPROM or another type of memory in which digital information may be stored. The storage 1408 may be magnetic disk storage, magnetic tape storage, optical storage, or any other type of device, which is capable of storing digital instructions and data.

Functions of the PCF 1400 generally known include, for example:

Interacting with the PDSN to maintain PPP connection;

Maintaining a state of reach ability for service between RAN and MS;

Buffering packets from the PDSN when radio resources are not in place or are insufficient to support flow from PDSN;

Communicating with Radio Resource Control (RRC) to request reach ability to relay packets to MS;

Relaying packets between MS and PRF;

Handling handoff for packet data calls;

Interacting with other PCF to receive packet data service profile of MS for hard handoff; and Collecting and sending accounting information to PDSN, among other functions.

The network manager interface 1406 couples to a network manager console 1416, which allows a network manager to interface with the PCF 1400 via a network manager console 1416. The network manager console 1416 may be a keypad/display or may be a more complex device, such as a personal computer, which allows the manager to interface with the PCF 1400. However, the network manager may interface with the PCF 1400 using other techniques as well, e.g., via a card coupled to the peripheral interface 1410. The peripheral interface 1410 couples to a BSC interface 1418 and an R-P network interface 1424. The BSC interface 1418 couples the PCF 1400 to a BSC, e.g., the BSC 110 of FIG. 1, the BSC 1202 of FIG. 12, etc. The R-P network interface 1422 couples the PCF 1400 to the R-P network 1424.

Service Quality Level Instructions (SQLI) 1412 are loaded into the storage 1408 of the PCF 1400. Upon their execution, a portion of the SQLI 1412 is downloaded into memory 1404 (as SQLI 1414). The processor 1402 then executes the SQLI 1414 to perform the operations described herein performed by the PCF 1400. The programming and operation of digital computers is generally known to perform such steps. Thus, the manner in which the processor 1402 and the other components of the PCF 1400 function to perform these operations are not further described herein.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for managing Radio Access Network (RAN) resources to service forward link packet data transmissions, the method comprising:
   receiving a data packet from a packet data network, the data packet directed toward a Mobile Station (MS) serviced by the RAN and including a packet service quality level indicator;
   mapping the packet service quality level indicator to a corresponding set of RAN resources;
   attempting to allocate the corresponding set of RAN resources to service the transmission of the data packet to the MS;
   upon a partial allocation of the corresponding set of RAN resources, responding to the packet data network indicating the partial allocation;
   upon a full allocation of the corresponding set of RAN resources, responding to the packet data network indicating the full allocation; and
   upon at least a partial allocation of the corresponding set of RAN resources, forwarding the data packet to the MS.

2. The method of claim 1, further comprising, upon a partial allocation of the corresponding set of RAN resources remarking the data packet with a new packet service quality level indicator, the new packet service quality level indicator corresponding to the partial allocation of the corresponding set of RAN resources.

3. The method of claim 2, further comprising:
   receiving another data packet from the packet data network directed toward the MS that includes the packet service quality level indicator; and
   remarking the another data packet with the new packet service quality level indicator.

4. The method of claim 1, wherein mapping the packet service quality level indicator to the corresponding set of RAN resources comprises:
   determining that the packet service quality level indicator requires a specific performance level; and
   determining a corresponding set of RAN resources that will satisfy the specific performance level.

5. The method of claim 1, further comprising:
   determining whether the corresponding set of RAN resources may be allocated to the MS; and
   when the corresponding set of RAN resources may not be allocated to the MS, not attempting to allocate the full corresponding set of RAN resources.

6. The method of claim 1, wherein mapping the packet service quality level indicator to the corresponding set of RAN resources comprises:
   determining that the packet service quality level indicator requires a differential service level;
   determining a plurality of sets of RAN resources supported for the MS; and
   selecting a one of the plurality of sets of RAN resources supported for the MS that satisfies the differential service level.

7. The method of claim 1, further comprising:
   receiving another data packet from the packet data network directed toward the MS that includes a different packet service quality level indicator;
   mapping the different packet service quality level indicator to a corresponding different set of RAN resources;
   attempting to allocate the corresponding different set of RAN resources to the MS; and
   upon an allocation of the corresponding different set of RAN resources, forwarding the data packet to the MS.

8. The method of claim 1, further comprising notifying a Packet Data Servicing Node (PDSN) of a packet service quality level corresponding to an allocated set of RAN resources.

9. A method for managing Radio Access Network (RAN) resources to service reverse link packet data transmissions, the method comprising:
   receiving a data packet from a Mobile Station (MS) serviced by the RAN, the data packet intended for a coupled packet data network and including a packet service quality level indicator;
   determining a set of RAN resources that have been allocated to service the transmission of the data packet;
   mapping the allocated set of RAN resources to a RAN service quality level indicator; and
   when the packet service quality level indicator does not correspond to the RAN service quality level indicator, remarking the data packet with a new packet service quality level indicator corresponding to the RAN service quality level indicator.

10. The method of claim 9, further comprising:
    receiving another data packet from the MS intended for the coupled packet data network that includes the packet service quality level indicator; and
    remarking the another data packet with the new packet service quality level indicator.

11. The method of claim 9, wherein mapping the allocated set of RAN resources to the RAN service quality level indicator comprises:
    determining that the packet service quality level indicator requires a specific performance level; and
    determining a RAN service quality level indicator that maps to the specific performance level.

12. The method of claim 9, wherein mapping the allocated set of RAN resources to the RAN service quality level indicator comprises:
    determining that the packet service quality level indicator requires a differential service level;
    determining a RAN precedence level corresponding to the allocated set of RAN resources;

determining a plurality of RAN precedence levels supported for the MS; and determining a differential RAN service quality level indicator that corresponds to the allocated set of RAN resources.

13. The method of claim 9, further comprising:

receiving another data packet from the MS serviced by the RAN, the another data packet intended for the coupled packet data network and including a different packet service quality level indicator;

determining a different set of allocated RAN resources that are servicing the transmission of the data packet to the packet data network;

mapping the different set of allocated RAN resources to a different RAN service quality level indicator; and when the different packet service quality level indicator does not correspond to the different RAN service quality level indicator, remarking the another data packet with another packet service quality level indicator corresponding to the different RAN service quality level indicator.

14. A Packet Data Serving Node (PDSN) that interfaces a Radio Access Network (RAN) to a packet network, the PDSN comprising:

a processor coupled to a processor bus;

memory coupled to the processor via the processor bus;

a first interface coupled to the processor bus that interfaces the PDSN to the packet network;

a second interface coupled to the processor bus that interfaces the PDSN to the RAN; and the memory storing a set of instructions executable by the processor, the set of instructions comprising:

a plurality of instructions that, upon execution by the processor, cause the PDSN to receive a data packet from the packet data network, the data packet directed toward a Mobile Station (MS) serviced by the RAN and including a packet service quality level indicator;

a plurality of instructions that, upon execution by the processor, cause the PDSN to interact with the RAN to map the packet service quality level indicator to a corresponding set of RAN resources;

a plurality of instructions that, upon execution by the processor, cause the PDSN to interact with the RAN in attempting to allocate the corresponding set of RAN resources to service the transmission of the data packet to the MS;

a plurality of instructions that, upon execution by the processor, cause the PDSN to, upon a partial allocation of the corresponding set of RAN resources, respond to the packet data network indicating the partial allocation;

a plurality of instructions that, upon execution by the processor, cause the PDSN to, upon a full allocation of the corresponding set of RAN resources, respond to the packet data network indicating the full allocation; and a plurality of instructions that, upon execution by the processor, cause the PDSN to, upon at least a partial allocation of the corresponding set of RAN resources, forward the data packet to the MS via the RAN.

15. The Packet Data Serving Node of claim 14, wherein the set of instructions further comprise a plurality of instructions that, upon execution by the processor, cause the PDSN to, upon a partial allocation of the corresponding set of RAN resources, remark the data packet with a new packet service quality level indicator, the new packet service quality level indicator corresponding to the partial allocation of the corresponding set of RAN resources.

16. The Packet Data Serving Node of claim 15, wherein the set of instructions further comprise:

a plurality of instructions that, upon execution by the processor, cause the PDSN to receive another data packet from the packet data network directed toward the MS that includes the packet service quality level indicator; and a plurality of instructions that, upon execution by the processor, cause the PDSN to remark the another data packet with the new packet service quality level indicator.

17. The Packet Data Serving Node of claim 14, wherein when the PDSN maps the packet service quality level indicator to the corresponding set of RAN resources:

the PDSN determines that the packet service quality level indicator requires a specific performance level; and the PDSN determines that the corresponding set of RAN resources will satisfy the specific performance level.

18. The Packet Data Serving Node of claim 14, wherein the set of instructions further comprise:

a plurality of instructions that, upon execution by the processor, cause the PDSN to determine whether a partial set of RAN resources has been allocated to the MS; and a plurality of instructions that, upon execution by the processor, cause the PDSN to remark the data packet with a new packet service quality level indicator, the new packet service quality level indicator corresponding to the partial set of RAN resources that have been allocated to the MS.

19. The Packet Data Serving Node of claim 14, wherein the set of instructions further comprise:

a plurality of instructions that, upon execution by the processor, cause the PDSN to receive another data packet from the packet data network directed toward the MS that includes a different packet service quality level indicator; and a plurality of instructions that, upon execution by the processor, cause the PDSN to interact with the RAN to map the different packet service quality level indicator to a corresponding different set of RAN resources.

20. A Base Station Controller (BSC) operating in conjunction with other components of a Radio Access Network (RAN) and interfaced to a Packet Data Serving Node (PDSN), the Base Station Controller comprising:

a processor coupled to a processor bus;

memory coupled to the processor via the processor bus;

a first interface coupled to the processor bus that interfaces the BSC to the PDSN;

a second interface coupled to the processor bus that interfaces the BSC to remaining portions of the RAN; and the memory storing a set of instructions executable by the processor, the set of instructions comprising:

a plurality of instructions that, upon execution by the processor, cause the BSC to receive a data packet from a Mobile Station (MS) serviced by the RAN, the data packet intended for the PDSN and including a packet service quality level indicator;

a plurality of instructions that, upon execution by the processor, cause the BSC to determine a set of allocated RAN resources that are servicing the transmission of the data packet to the packet data network;

a plurality of instructions that, upon execution by the processor, cause the BSC to map the allocated set of RAN resources to a RAN service quality level indicator; and a plurality of instructions that, upon execution by the processor, cause the BSC to, when the packet service quality level indicator does not correspond to the RAN service quality level indicator, indicate to the PDSN a new packet service quality level indicator corresponding to the RAN service quality level indicator.

21. The Base Station Controller of claim 20, the set of instructions further comprising:

a plurality of instructions that, upon execution by the processor, cause the BSC to receive another data packet from the MS intended for the PDSN that includes the packet service quality level indicator; and a plurality of instructions that, upon execution by the processor, cause the BSC to indicate to the PDSN the new packet service quality level indicator.

22. The Base Station Controller of claim 20, wherein in mapping the allocated set of RAN resources to a RAN service quality level indicator, the Base Station Controller:

determines that the packet service quality level indicator requires a specific performance level; and determines a RAN service quality level indicator that maps exactly to the allocated set of RAN resources.

23. The Base Station Controller of claim 20, wherein in mapping the allocated set of RAN resources to a RAN service quality level indicator, the BSC:

determines that the packet service quality level indicator requires a differential service level;

determines a RAN precedence level corresponding to the allocated set of RAN resources;

determines a plurality of RAN precedence levels supported for the MS; and determines a differential packet service quality level indicator that corresponds to the allocated set of RAN resources.

24. The Base Station Controller of claim 20, the set of instructions further comprising:

a plurality of instructions that, upon execution by the processor, cause the BSC to respond to the PDSN servicing the data packet with an indication of a packet service quality level supported by the RAN.

25. A Packet Control Function (PCF) interfaced to a Base Station Controller (BSC) that operates in conjunction with other components of a Radio Access Network (RAN) and that interfaces to a Packet Data Serving Node (PDSN), the Packet Control Function comprising:

a processor coupled to a processor bus;

memory coupled to the processor via the processor bus;

a first interface coupled to the processor bus that interfaces the PCF to the BSC;

a second interface coupled to the processor bus that interfaces the PCF to the PDSN; and the memory storing a set of instructions executable by the processor, the set of instructions comprising:

a plurality of instructions that, upon execution by the processor, cause the PCF to receive a data packet from a Mobile Station (MS) serviced by the RAN, the data packet intended for the PDSN and including a packet service quality level indicator;

a plurality of instructions that, upon execution by the processor, cause the PCF to determine a set of allocated RAN resources that are servicing the transmission of the data packet to the packet data network;

a plurality of instructions that, upon execution by the processor, cause the PCF to map the allocated set of RAN resources to a RAN service quality level indicator; and a plurality of instructions that, upon execution by the processor, cause the PCF to, when the packet service quality level indicator does not correspond to the RAN service quality level indicator, indicate to the PDSN a new packet service quality level indicator corresponding to the RAN service quality level indicator.

26. The Packet Control Function of claim 25, the set of instructions further comprising:

a plurality of instructions that, upon execution by the processor, cause the PCF to receive another data packet from the MS intended for the PDSN that includes the packet service quality level indicator; and a plurality of instructions that, upon execution by the processor, cause the PCF to indicate to the PDSN the new packet service quality level indicator.

27. The Packet Control Function of claim 25, wherein in mapping the allocated set of RAN resources to a RAN service quality level indicator, the Packet Control Function:

determines that the new packet service quality level indicator requires a specific performance level; and determines a service quality level indicator that maps exactly to the allocated set of RAN resources.

28. The Packet Control Function of claim 25, wherein in mapping the allocated set of RAN resources to a RAN service quality level indicator, the Packet Control Function:

determines that the packet service quality level indicator requires a differential service level;

determines a RAN precedence level corresponding to the allocated set of RAN resources;

determines a plurality of RAN precedence levels supported for the MS; and determines a differential RAN service quality level indicator that corresponds to the allocated set of RAN resources.

29. The Packet Control Function of claim 25, the set of instructions further comprising:

a plurality of instructions that, upon execution by the processor, cause the PCF to respond to the PDSN servicing the data packet with an indication of a packet service quality level supported by the RAN.

30. A Base Station Controller (BSC) operating in conjunction with other components of a Radio Access Network (RAN) and interfaced to a Packet Data Serving Node (PDSN), the Base Station Controller comprising:

a processor coupled to a processor bus;

memory coupled to the processor via the processor bus;

a first interface coupled to the processor bus that interfaces the BSC to the PDSN;

a second interface coupled to the processor bus that interfaces the BSC to remaining portions of the RAN; and the memory storing a set of instructions executable by the processor, the set of instructions comprising:

a plurality of instructions that, upon execution by the processor, cause the BSC to receive a request from the PDSN to service packet data transmissions from the PDSN to a MS at a packet service quality level indicator;

a plurality of instructions that, upon execution by the processor, cause the BSC to determine a set of RAN resources that would satisfy the packet service quality level indicator;

a plurality of instructions that, upon execution by the processor, cause the BSC to attempt to allocate the set of RAN resources that would satisfy the packet service quality level;

a plurality of instructions that, upon execution by the processor, cause the BSC to, upon a partial allocation of the corresponding set of RAN resources, respond to the PDSN indicating the partial allocation; and a plurality of instructions that, upon execution by the processor, cause the BSC to, upon a full allocation of the corresponding set of RAN resources, respond to the PDSN indicating the full allocation.

31. The Base Station Controller of claim 30, the set of instructions further comprising:

a plurality of instructions that, upon execution by the processor, cause the BSC to, upon a full allocation of the corresponding set of RAN resources, to indicate to the PDSN that the packet service quality level indicator corresponding is met.

32. The Base Station Controller of claim 30, the set of instructions further comprising:

a plurality of instructions that, upon execution by the processor, cause the BSC to, upon a partial allocation of the corresponding set of RAN resources, to indicate to the PDSN that the packet service quality level indicator corresponding is partially met.

33. The Base Station Controller of claim 30, the set of instructions further comprising:

a plurality of instructions that, upon execution by the processor, cause the BSC to, upon a failed allocation of the corresponding set of RAN resources, to indicate to the PDSN that the allocation of RAN resources has failed.

34. The Base Station Controller of claim 30, wherein in mapping the allocated set of RAN resources to a RAN service quality level indicator, the Base Station Controller:

determines that the packet service quality level indicator requires a specific performance level; and determines a RAN service quality level indicator that maps exactly to the allocated set of RAN resources.

35. The Base Station Controller of claim 30, wherein in mapping the allocated set of RAN resources to a RAN service quality level indicator, the Base Station Controller:

determines that the packet service quality level indicator requires a differential service level;

determines a RAN precedence level corresponding to the allocated set of RAN resources;

determines a plurality of RAN precedence levels supported for the MS; and determines a differential packet service quality level indicator that corresponds to the allocated set of RAN resources.

36. A Packet Control Function (PCF) interfaced to a Base Station Controller (BSC) that operates in conjunction with other components of a Radio Access Network (RAN) and that interfaces to a Packet Data Serving Node (PDSN), the Packet Control Function comprising:

a processor coupled to a processor bus;

memory coupled to the processor via the processor bus;

a first interface coupled to the processor bus that interfaces the PCF to the BSC;

a second interface coupled to the processor bus that interfaces the PCF to the PDSN; and the memory storing a set of instructions executable by the processor, the set of instructions comprising:

a plurality of instructions that, upon execution by the processor, cause the PCF to receive a request from the PDSN to service packet data transmissions from the PDSN to a MS at a packet service quality level indicator;

a plurality of instructions that, upon execution by the processor, cause the PCF to determine a set of RAN resources that would satisfy the packet service quality level indicator;

a plurality of instructions that, upon execution by the processor, cause the PCF to attempt to allocate the set of RAN resources that would satisfy the packet service quality level;

a plurality of instructions that, upon execution by the processor, cause the PCF to, upon a partial allocation of the corresponding set of RAN resources, respond to the PDSN indicating the partial allocation; and a plurality of instructions that, upon execution by the processor, cause the PCF to, upon a full allocation of the corresponding set of RAN resources, respond to the PDSN indicating the full allocation.

37. The Packet Control Function of claim 36, the set of instructions further comprising:

a plurality of instructions that, upon execution by the processor, cause the PCF to, upon a full allocation of the corresponding set of RAN resources, to indicate to the PDSN that the packet service quality level indicator corresponding is met.

38. The Packet Control Function of claim 36, the set of instructions further comprising:

a plurality of instructions that, upon execution by the processor, cause the PCF to, upon a partial allocation of the corresponding set of RAN resources, to indicate to the PDSN that the packet service quality level indicator corresponding is partially met.

39. The Packet Control Function of claim 36, the set of instructions further comprising:

a plurality of instructions that, upon execution by the processor, cause the PCF to, upon a failed allocation of the corresponding set of RAN resources, to indicate to the PDSN that the allocation of RAN resources has failed.

40. The Packet Control Function of claim 36, wherein in mapping the allocated set of RAN resources to a RAN service quality level indicator, the Packet Control Function:

determines that the packet service quality level indicator requires a specific performance level; and determines a RAN service quality level indicator that maps exactly to the allocated set of RAN resources.

41. The Packet Control Function of claim 36, wherein in mapping the allocated set of RAN resources to a RAN service quality level indicator, the Packet Control Function:

determines that the packet service quality level indicator requires a differential service level;

determines a RAN precedence level corresponding to the allocated set of RAN resources;

determines a plurality of RAN precedence levels supported for the MS; and determines a differential packet service quality level indicator that corresponds to the allocated set of RAN resources.

42. A computer readable medium that stores a plurality of software instructions for execution by a Packet Data Serving Node (PDSN) that interfaces a Radio Access Network (RAN) to a packet network, the computer readable medium comprising:
 a plurality of instructions that, upon execution by the PDSN, cause the PDSN to receive a data packet from the packet data network, the data packet directed toward a Mobile Station (MS) serviced by the RAN and including a packet service quality level indicator;
 a plurality of instructions that, upon execution by the PDSN, cause the PDSN to interact with the RAN to map the packet service quality level indicator to a corresponding set of RAN resources;
 a plurality of instructions that, upon execution by the PDSN, cause the PDSN to interact with the RAN in attempting to allocate the corresponding set of RAN resources to service the transmission of the data packet to the MS;
 a plurality of instructions that, upon execution by the PDSN, cause the PDSN to, upon a partial allocation of the corresponding set of RAN resources, respond to the packet data network indicating the partial allocation;
 a plurality of instructions that, upon execution by the PDSN, cause the PDSN to, upon a full allocation of the corresponding set of RAN resources, respond to the packet data network indicating the full allocation; and
 a plurality of instructions that, upon execution by the PDSN, cause the PDSN to, upon an allocation of the corresponding set of RAN resources, forward the data packet to the MS via the RAN.

43. A computer readable medium that stores a plurality of software instructions for execution by a Base Station Controller (BSC) operating in conjunction with other components of a Radio Access Network (RAN) and interfaced to a Packet Data Serving Node (PDSN), the computer readable medium comprising:
 a plurality of instructions that, upon execution by the BSC, cause the BSC to receive a data packet from a Mobile Station (MS) serviced by the RAN, the data packet intended for the PDSN and including a packet service quality level indicator;
 a plurality of instructions that, upon execution by the BSC, cause the BSC to determine a set of allocated RAN resources that are servicing the transmission of the data packet to the packet data network;
 a plurality of instructions that, upon execution by the BSC, cause the BSC to map the allocated set of RAN resources to a RAN service quality level indicator; and
 a plurality of instructions that, upon execution by the BSC, cause the BSC to, when the packet service quality level indicator does not correspond to the RAN service quality level indicator, indicate to the PDSN a new packet service quality level indicator corresponding to the RAN service quality level indicator.

44. A computer readable medium that stores a plurality of software instructions for execution by a Packet Control Function (PCF) interfaced to a Base Station Controller (BSC) that operates in conjunction with other components of a Radio Access Network (RAN) and that interfaces to a Packet Data Serving Node (PDSN), the computer readable medium comprising:
 a plurality of instructions that, upon execution by the processor, cause the PCF to receive a data packet from a Mobile Station (MS) serviced by the RAN, the data packet intended for the PDSN and including a packet service quality level indicator;
 a plurality of instructions that, upon execution by the PCF, cause the PCF to determine a set of allocated RAN resources that are servicing the transmission of the data packet to the packet data network;
 a plurality of instructions that, upon execution by the PCF, cause the PCF to map the allocated set of RAN resources to a RAN service quality level indicator; and
 a plurality of instructions that, upon execution by the PCF, cause the PCF to, when the packet service quality level indicator does not correspond to the RAN service quality level indicator, indicate to the PDSN a new packet service quality level indicator corresponding to the RAN service quality level indicator.

45. A computer readable medium that stores a plurality of software instructions for execution by a Base Station Controller (BSC) operating in conjunction with other components of a Radio Access Network (RAN) and interfaced to a Packet Data Serving Node (PDSN), the computer readable medium comprising:
 a plurality of instructions that, upon execution by the BSC, cause the BSC to receive a request from the PDSN to service packet data transmissions from the PDSN to a MS at a packet service quality level indicator;
 a plurality of instructions that, upon execution by the BSC, cause the BSC to determine a set of RAN resources that would satisfy the packet service quality level indicator;
 a plurality of instructions that, upon execution by the BSC, cause the BSC to attempt to allocate the set of RAN resources that would satisfy the packet service quality level;
 a plurality of instructions that, upon execution by the BSC, cause the BSC to, upon a partial allocation of the corresponding set of RAN resources, respond to the PDSN indicating the partial allocation; and
 a plurality of instructions that, upon execution by the BSC, cause the BSC to, upon a full allocation of the corresponding set of RAN resources, respond to the PDSN indicating the full allocation.

46. A computer readable medium that stores a plurality of software instructions for execution by a Packet Control Function (PCF) interfaced to a Base Station Controller (BSC) that operates in conjunction with other components of a Radio Access Network (RAN) and that interfaces to a Packet Data Serving Node (PDSN), the computer readable medium comprising:
 a plurality of instructions that, upon execution by the PCF, cause the PCF to receive a request from the PDSN to service packet data transmissions from the PDSN to a MS at a packet service quality level indicator;
 a plurality of instructions that, upon execution by the PCF, cause the PCF to determine a set of RAN resources that would satisfy the packet service quality level indicator;
 a plurality of instructions that, upon execution by the PCF, cause the PCF to attempt to allocate the set of RAN resources that would satisfy the packet service quality level;
 a plurality of instructions that, upon execution by the BSC, cause the BSC to, upon a partial allocation of the corresponding set of RAN resources, respond to the PDSN indicating the partial allocation; and
 a plurality of instructions that, upon execution by the BSC, cause the BSC to, upon a full allocation of the corresponding set of RAN resources, respond to the PDSN indicating the full allocation.

* * * * *

UNITED STATES PATENT AND TRADEMARK OFFICE
CERTIFICATE OF CORRECTION

PATENT NO. : 7,092,727 B1 Page 1 of 1
APPLICATION NO. : 09/708782
DATED : August 15, 2006
INVENTOR(S) : Xiao-Dong Li et al.

It is certified that error appears in the above-identified patent and that said Letters Patent is hereby corrected as shown below:

Title page, item should read
-- (75) Inventors: Xiao-Dong Li, Ottawa (CA);
                Patrick Lie Chin Cheong, Nepean (CA);
                Ashraf S. Mahmoud, Nepean (CA);
                Mazda Salmanian, Kanata (CA) --

Signed and Sealed this

Nineteenth Day of December, 2006

JON W. DUDAS
*Director of the United States Patent and Trademark Office*